United States Patent
Beaurepaire

(10) Patent No.: US 12,235,119 B2
(45) Date of Patent: Feb. 25, 2025

(54) METHODS AND APPARATUSES FOR LATE LANE CHANGE PREDICTION AND MITIGATION

(71) Applicant: HERE Global B.V., Eindhoven (NL)

(72) Inventor: Jerome Beaurepaire, Nantes (FR)

(73) Assignee: HERE GLOBAL B.V., Eindhoven (NL)

( * ) Notice: Subject to any disclaimer, the term of this patent is extended or adjusted under 35 U.S.C. 154(b) by 295 days.

(21) Appl. No.: 17/804,644

(22) Filed: May 31, 2022

(65) Prior Publication Data
US 2023/0408276 A1    Dec. 21, 2023

(51) Int. Cl.
| | | |
|---|---|---|
| *G01C 21/34* | (2006.01) | |
| *G01C 21/00* | (2006.01) | |
| *G05B 13/02* | (2006.01) | |
| *G05B 13/04* | (2006.01) | |
| *G08G 1/01* | (2006.01) | |
| *G08G 1/04* | (2006.01) | |

(52) U.S. Cl.
CPC ..... *G01C 21/3492* (2013.01); *G01C 21/3807* (2020.08); *G05B 13/0265* (2013.01); *G05B 13/048* (2013.01); *G08G 1/0112* (2013.01); *G08G 1/04* (2013.01)

(58) Field of Classification Search
CPC ............ G01C 21/3492; G01C 21/3807; G05B 13/0265; G05B 13/048; G08G 1/0112; G08G 1/04
See application file for complete search history.

(56) References Cited

U.S. PATENT DOCUMENTS

| | | | |
|---|---|---|---|
| 10,611,371 B2 | 4/2020 | Kusano et al. | |
| 10,760,918 B2 | 9/2020 | Fowe et al. | |
| 2021/0001860 A1 | 1/2021 | Kawasaki | |
| 2021/0114604 A1 | 4/2021 | Nagaraja et al. | |
| 2022/0219701 A1* | 7/2022 | Chikamori | B60W 30/18163 |
| 2023/0202530 A1* | 6/2023 | Abad | G05B 13/0265 701/26 |

OTHER PUBLICATIONS

Du et al., "Learning-Based Lane-Change Behaviour Detection for Intelligent and Connected Vehicles", Hindawi Computational Intelligence and Neuroscience, vol. 2020, (Oct. 1, 2020), 13 pages.
Yang et al., "Analyzing the Delays of Target Lane Vehicles Caused by Vehicle Lane-Changing Operation", Scientific Reports, No. 11, Article No. 22047 (Nov. 11, 2021), 10 pages.

* cited by examiner

*Primary Examiner* — Hussein Elchanti
*Assistant Examiner* — Oliver Tan

(57) ABSTRACT

A network apparatus, for example, obtains probe data corresponding to a respective vehicle making a late lane change while traversing a TME of a traversable network. Location information indicating a location of the late lane change is extracted from the probe data. Map, weather, and/or traffic data for the location is obtained. A late lane change feature description is generated based on information extracted from the probe data and the map, weather, and/or traffic data. A model is trained using a machine learning technique and training data comprising the late lane change feature description. The model is executed to generate a late lane change prediction corresponding to a TME of a digital map. The network apparatus causes at least one of (a) the digital map to be updated, (b) traffic data corresponding to the TME to be updated, or (c) a navigation-related function to be performed based on the prediction.

20 Claims, 8 Drawing Sheets

METHODS AND APPARATUSES FOR LATE LANE CHANGE PREDICTION AND MITIGATION

TECHNOLOGICAL FIELD

An example embodiment relates generally to predicting, reducing, optimizing, and mitigating late lane change incidents for navigation and traffic in a traversable network. An example embodiment relates generally to generating and using late lane change predictions for corresponding traversable map elements in performing navigation and traffic functions or predictions.

BACKGROUND

Late lane changes may occur in various scenarios and have various consequences of traffic on a corresponding road segment. For example, a late lane change may increase traffic along the corresponding road segment by causing other drivers to slow down, causing collisions, and/or otherwise disrupting the flow of traffic along the road segment.

BRIEF SUMMARY OF VARIOUS EMBODIMENTS

Various embodiments provide methods, apparatuses, systems, computer program products, and/or the like for predicting late lane changes and/or using predictions regarding late lane changes to reduce the advent of late changes and/or mitigate the effects on traffic flow on late lane changes. In various embodiments, probe data is used to identify instances of late lane change and information regarding the instances of late lane change are identified and/or extracted and then used to generate late lane change feature descriptions. A late lane change model is trained based at least in part on a plurality of late lane change feature descriptions. The late lane change model is then used to generate late lane change predictions for one or more traversable map elements (TMEs) corresponding to road segments and/or traversable lanes of road segments of at least traversable network. The late lane change predictions are stored to a digital map in association with the corresponding TME, used as input to one or more navigation-related functions, used to provide to notifications and/or alerts to vehicles and/or vehicle operators/passengers traversing or in the vicinity of the corresponding TME, and/or the like.

According to an aspect of the present disclosure, a method is provided for performing late lane change aware navigation. The method comprises obtaining, by one or more processors (e.g., of a network apparatus), a plurality of instances of probe data corresponding to a vehicle making a lane change while traversing at least a portion of a traversable network. The method further comprises responsive to determining that the lane change is a late lane change, extracting, by the one or more processors, location information from at least one of the plurality of instances of probe data. The location information indicates a location where the late lane change occurred. The method further comprises obtaining, by the one or more processors, at least one of map data, weather data, or traffic data corresponding to the location where the late lane change occurred; generating, by the one or more processors, a late lane change feature description based on information regarding the late lane change extracted from the plurality of instances of probe data and the at least one of map data, weather data, or traffic data; and training, by the one or more processors, a late lane change model using a machine learning technique and training data, the training data comprising the late lane change feature description. the method further comprises executing, by the one or more processors, the late lane change model to generate a late lane change prediction corresponding to a traversable map element of a digital map that provides a representation of the traversable network; and causing, by the one or more processors, at least one of (a) the digital map to be updated based at least in part on the late lane change prediction, (b) traffic data corresponding to the traversable map element to be updated based at least in part on the late lane change prediction, or (c) a navigation-related function to be performed using at least a portion of the late lane change prediction as input.

In an example embodiment, determining that the lane change is a late change comprises processing at least one of the plurality of instances of probe data to determine at least one of (a) how long before the end of a maneuver a driver changed lanes, (b) how many times a maneuver has been repeated if announced, or (c) the type of lane marking on road surface where the maneuver was performed.

In an example embodiment, the method further comprises determining late lane change elements configured to characterize the lane change, the late lane change elements comprising at least one of a time of the maneuver, start of the maneuver, time duration of the maneuver, length duration of the maneuver, end of the maneuver, number of vehicles impacted by the maneuver, speed of the vehicle, weather conditions, curvature of a traversable map element corresponding to a road segment on which the late lane change occurred, number of lanes of the road segment on which the late lane change occurred, or visibility information for the location where the late lane change occurred.

In an example embodiment, determining that the lane change is a late change comprises determining that the lane change that satisfies at least one of (a) a time until beginning of next maneuver threshold, (b) a distance until beginning of next maneuver threshold, (c) a lane change time duration threshold, (d) a lane change distance duration threshold, (e) a time between announcing lane change and beginning the lane change threshold, or (f) a statistical threshold.

In an example embodiment, the method further comprises classifying a severity of the late lane change based at least in part on at least a portion of the plurality of instances of probe data corresponding to the vehicle making the lane change.

In an example embodiment, the late lane change prediction comprises an expected severity of lane change.

In an example embodiment, the traffic data corresponding to the location where the lane change occurred is determined based at least in part on at least one of a vehicle camera data, Lidar data, radar data, or traffic monitoring data corresponding to the location where the lane change occurred and a time when the lane change occurred.

In an example embodiment, the late lane change model is configured to receive as input at least one of signage obstruction information, visibility information, vehicle navigation system information, driver attentiveness information, or point of interest proximity information.

In an example embodiment, the method further comprises using transfer learning to train the late lane change model to generate late lane change predictions for a second traversable map element, wherein the training data does not comprise data corresponding to the second traversable map element for which sufficient training data is not available.

In an example embodiment, using at least a portion of the late lane change prediction as input for performing the positioning and/or navigation-related function causes a human perceivable notification to be provided.

In an example embodiment, the human perceivable notification is generated based at least in part on an expected severity of lane change indicated by the late lane change prediction.

According to another aspect, an apparatus is provided. In an example embodiment, the apparatus comprises at least one processor and at least one memory storing computer program code. The at least one memory and the computer program code are configured to, with the processor, cause the apparatus to at least obtain a plurality of instances of probe data corresponding to a vehicle making a lane change while traversing at least a portion of a traversable network; responsive to determining that the lane change is a late lane change, extract location information from at least one of the plurality of instances of probe data, the location information indicating a location where the late lane change occurred; obtain at least one of map data, weather data, or traffic data corresponding to the location where the late lane change occurred; generate a late lane change feature description based on information regarding the late lane change extracted from the plurality of instances of probe data and the at least one of map data, weather data, or traffic data; train a late lane change model using a machine learning technique and training data comprising the late lane change feature description; execute the late lane change model to generate a late lane change prediction corresponding to a traversable map element of a digital map that provides a representation of the traversable network; and cause at least one of (a) the digital map to be updated based at least in part on the late lane change prediction, (b) traffic data corresponding to the traversable map element to be updated based at least in part on the late lane change prediction, or (c) a navigation-related function to be performed using at least a portion of the late lane change prediction as input.

In an example embodiment, determining that the lane change is a late change comprises processing at least one of the plurality of instances of probe data to determine at least one of (a) how long before the end of a maneuver a driver changed lanes, (b) how many times a maneuver has been repeated if announced, or (c) the type of lane marking on road surface where the maneuver was performed.

In an example embodiment, the at least one memory and the computer program code are further configured to, with the processor, cause the apparatus to at least determine late lane change elements configured to characterize the lane change, the late lane change elements comprising at least one of a time of the maneuver, start of the maneuver, time duration of the maneuver, length duration of the maneuver, end of the maneuver, number of vehicles impacted by the maneuver, speed of the vehicle, weather conditions, curvature of a traversable map element corresponding to a road segment on which the late lane change occurred, number of lanes of the road segment on which the late lane change occurred, or visibility information for the location where the late lane change occurred.

In an example embodiment, determining that the lane change is a late change comprises determining that the lane change that satisfies at least one of (a) a time until beginning of next maneuver threshold, (b) a distance until beginning of next maneuver threshold, (c) a lane change time duration threshold, (d) a lane change distance duration threshold, (e) a time between announcing lane change and beginning the lane change threshold, or (f) a statistical threshold.

In an example embodiment, the at least one memory and the computer program code are further configured to, with the processor, cause the apparatus to at least classify a severity of the late lane change based at least in part on at least a portion of the plurality of instances of probe data corresponding to the vehicle making the lane change.

In an example embodiment, the late lane change prediction comprises an expected severity of lane change.

In an example embodiment, the traffic data corresponding to the location where the lane change occurred is determined based at least in part on at least one of a vehicle camera data, Lidar data, radar data, or traffic monitoring data corresponding to the location where the lane change occurred and a time when the lane change occurred.

In an example embodiment, the late lane change model is configured to receive as input at least one of signage obstruction information, visibility information, vehicle navigation system information, driver attentiveness information, or point of interest proximity information.

In an example embodiment, the at least one memory and the computer program code are further configured to, with the processor, cause the apparatus to at least use transfer learning to train the late lane change model to generate late lane change predictions for a second traversable map element, wherein the training data does not comprise data corresponding to the second traversable map element for which sufficient training data is not available.

In an example embodiment, using at least a portion of the late lane change prediction as input for performing the positioning and/or navigation-related function causes a human perceivable notification to be provided.

In an example embodiment, the human perceivable notification is generated based at least in part on an expected severity of lane change indicated by the late lane change prediction.

According to still another aspect, a computer program product is provided. In an example embodiment, the computer program product comprises at least one non-transitory computer-readable storage medium having computer-readable program code portions stored therein. The computer-readable program code portions comprise executable portions configured, when executed by a processor of an apparatus, to cause the apparatus to obtain a plurality of instances of probe data corresponding to a vehicle making a lane change while traversing at least a portion of a traversable network; responsive to determining that the lane change is a late lane change, extract location information from at least one of the plurality of instances of probe data, the location information indicating a location where the late lane change occurred; obtain at least one of map data, weather data, or traffic data corresponding to the location where the late lane change occurred; generate a late lane change feature description based on information regarding the late lane change extracted from the plurality of instances of probe data and the at least one of map data, weather data, or traffic data; train a late lane change model using a machine learning technique and training data comprising the late lane change feature description; execute the late lane change model to generate a late lane change prediction corresponding to a traversable map element of a digital map that provides a representation of the traversable network; and cause at least one of (a) the digital map to be updated based at least in part on the late lane change prediction, (b) traffic data corresponding to the traversable map element to be updated based at least in part on the late lane change prediction, or (c) a navigation-related function to be performed using at least a portion of the late lane change prediction as input. Further provided is a computer program product comprising instructions which, when the program is executed by a computer, cause the computer to carry out any of the steps described herein.

In an example embodiment, determining that the lane change is a late change comprises processing at least one of the plurality of instances of probe data to determine at least one of (a) how long before the end of a maneuver a driver changed lanes, (b) how many times a maneuver has been repeated if announced, or (c) the type of lane marking on road surface where the maneuver was performed.

In an example embodiment, the computer-readable program code portions comprise executable portions further configured, when executed by a processor of an apparatus, to cause the apparatus to determine late lane change elements configured to characterize the lane change, the late lane change elements comprising at least one of a time of the maneuver, start of the maneuver, time duration of the maneuver, length duration of the maneuver, end of the maneuver, number of vehicles impacted by the maneuver, speed of the vehicle, weather conditions, curvature of a traversable map element corresponding to a road segment on which the late lane change occurred, number of lanes of the road segment on which the late lane change occurred, or visibility information for the location where the late lane change occurred.

In an example embodiment, determining that the lane change is a late change comprises determining that the lane change that satisfies at least one of (a) a time until beginning of next maneuver threshold, (b) a distance until beginning of next maneuver threshold, (c) a lane change time duration threshold, (d) a lane change distance duration threshold, (e) a time between announcing lane change and beginning the lane change threshold, or (f) a statistical threshold.

In an example embodiment, the computer-readable program code portions comprise executable portions further configured, when executed by a processor of an apparatus, to cause the apparatus to classify a severity of the late lane change based at least in part on at least a portion of the plurality of instances of probe data corresponding to the vehicle making the lane change.

In an example embodiment, the late lane change prediction comprises an expected severity of lane change.

In an example embodiment, the traffic data corresponding to the location where the lane change occurred is determined based at least in part on at least one of a vehicle camera data, Lidar data, radar data, or traffic monitoring data corresponding to the location where the lane change occurred and a time when the lane change occurred.

In an example embodiment, the late lane change model is configured to receive as input at least one of signage obstruction information, visibility information, vehicle navigation system information, driver attentiveness information, or point of interest proximity information.

In an example embodiment, the computer-readable program code portions comprise executable portions further configured, when executed by a processor of an apparatus, to cause the apparatus to use transfer learning to train the late lane change model to generate late lane change predictions for a second traversable map element, wherein the training data does not comprise data corresponding to the second traversable map element for which sufficient training data is not available.

In an example embodiment, using at least a portion of the late lane change prediction as input for performing the positioning and/or navigation-related function causes a human perceivable notification to be provided.

In an example embodiment, the human perceivable notification is generated based at least in part on an expected severity of lane change indicated by the late lane change prediction.

According to still another aspect of the present disclosure, an apparatus is provided. The apparatus comprises means for obtaining a plurality of instances of probe data corresponding to a vehicle making a lane change while traversing at least a portion of a traversable network. The apparatus comprises means for, responsive to determining that the lane change is a late lane change, extracting location information from at least one of the plurality of instances of probe data. The location information indicates a location where the late lane change occurred. The apparatus comprises means for obtaining at least one of map data, weather data, or traffic data corresponding to the location where the late lane change occurred. The apparatus comprises means for generating a late lane change feature description based on information regarding the late lane change extracted from the plurality of instances of probe data and the at least one of map data, weather data, or traffic data. The apparatus comprises means for training a late lane change model using a machine learning technique and training data, the training data comprising the late lane change feature description. The apparatus comprises means for executing the late lane change model to generate a late lane change prediction corresponding to a traversable map element of a digital map that provides a representation of the traversable network. The apparatus comprises means for causing at least one of (a) the digital map to be updated based at least in part on the late lane change prediction, (b) traffic data corresponding to the traversable map element to be updated based at least in part on the late lane change prediction, or (c) a navigation-related function to be performed using at least a portion of the late lane change prediction as input.

According to another aspect, a method for training a late lane change model is provided. In an example embodiment, the method comprises generating respective late lane change feature descriptions for a plurality of late lane changes, a respective late lane change feature description comprising information regarding a respective late lane change and at least one of map data, weather data, or traffic data corresponding to a respective location of the respective late lane change; and training a late lane change model using a machine learning technique based at least in part training data comprising the respective late lane change feature descriptions. The late lane change model is trained such that the late lane change model is configured to receive an input feature description characterizing a prediction scenario corresponding to a traversable map element and provide a late lane change prediction corresponding to the prediction scenario. The late lane change prediction is configured to be used for at least one of (a) updating a digital map, (b) updating traffic data corresponding to the traversable map element, or (c) used as input for performing a navigation-related function.

In an example embodiment, the plurality of late lane changes each occurred along a first traversable map element and the late lane change model is configured to generate late lane change predictions corresponding to the first traversable map element.

In an example embodiment, the at least one memory and the computer program code are further configured to, with the processor, cause the apparatus to access historical late lane change information corresponding to late lane changes that occurred along a second traversable map element and use transfer learning and the historical late lane change information to cause the late lane change model to generate late lane change predictions for the second traversable map element.

In an example embodiment, the late lane change prediction comprises at least one of an indication of whether late lane changes are likely to occur under the prediction scenario, a likelihood that late lane changes will occur under the prediction scenario, an expected severity of late lane changes occurring under the prediction scenario, where along the traversable map element corresponding to the prediction scenario late lane changes are expected to occur, the expected direction of late lane changes, or expected delays caused by late lane changes under the prediction scenario.

In an example embodiment, the respective late lane change feature description is an instance of labeled input data comprising input data that contextualizes the respective late lane change and label data that characterizes the respective late lane change, and an input layer of the late lane change model is configured to receive the input data.

In an example embodiment, an output layer of the late lane change model is configured to provide output characterizing a predicted lane change.

According to another aspect, an apparatus is provided. In an example embodiment, the apparatus comprises at least one processor and at least one memory storing computer program code. The at least one memory and the computer program code are configured to, with the processor, cause the apparatus to at least generate respective late lane change feature descriptions for a plurality of late lane changes, a respective late lane change feature description comprising information regarding a respective late lane change and at least one of map data, weather data, or traffic data corresponding to a respective location of the respective late lane change; and train a late lane change model using a machine learning technique based at least in part training data comprising the respective late lane change feature descriptions. The late lane change model is trained such that the late lane change model is configured to receive an input feature description characterizing a prediction scenario corresponding to a traversable map element and provide a late lane change prediction corresponding to the prediction scenario. The late lane change prediction is configured to be used for at least one of (a) updating a digital map, (b) updating traffic data corresponding to the traversable map element, or (c) used as input for performing a navigation-related function.

In an example embodiment, the plurality of late lane changes each occurred along a first traversable map element and the late lane change model is configured to generate late lane change predictions corresponding to the first traversable map element.

In an example embodiment, the at least one memory and the computer program code are further configured to, with the processor, cause the apparatus to access historical late lane change information corresponding to late lane changes that occurred along a second traversable map element and use transfer learning and the historical late lane change information to cause the late lane change model to generate late lane change predictions for the second traversable map element.

In an example embodiment, the late lane change prediction comprises at least one of an indication of whether late lane changes are likely to occur under the prediction scenario, a likelihood that late lane changes will occur under the prediction scenario, an expected severity of late lane changes occurring under the prediction scenario, where along the traversable map element corresponding to the prediction scenario late lane changes are expected to occur, the expected direction of late lane changes, or expected delays caused by late lane changes under the prediction scenario.

In an example embodiment, the respective late lane change feature description is an instance of labeled input data comprising input data that contextualizes the respective late lane change and label data that characterizes the respective late lane change, and an input layer of the late lane change model is configured to receive the input data.

In an example embodiment, an output layer of the late lane change model is configured to provide output characterizing a predicted lane change.

According to still another aspect, a computer program product is provided. In an example embodiment, the computer program product comprises at least one non-transitory computer-readable storage medium having computer-readable program code portions stored therein. The computer-readable program code portions comprise executable portions configured, when executed by a processor of an apparatus, to cause the apparatus to generate respective late lane change feature descriptions for a plurality of late lane changes, a respective late lane change feature description comprising information regarding a respective late lane change and at least one of map data, weather data, or traffic data corresponding to a respective location of the respective late lane change; and train a late lane change model using a machine learning technique based at least in part training data comprising the respective late lane change feature descriptions. The late lane change model is trained such that the late lane change model is configured to receive an input feature description characterizing a prediction scenario corresponding to a traversable map element and provide a late lane change prediction corresponding to the prediction scenario. The late lane change prediction is configured to be used for at least one of (a) updating a digital map, (b) updating traffic data corresponding to the traversable map element, or (c) used as input for performing a navigation-related function.

In an example embodiment, the plurality of late lane changes each occurred along a first traversable map element and the late lane change model is configured to generate late lane change predictions corresponding to the first traversable map element.

In an example embodiment, the at least one memory and the computer program code are further configured to, with the processor, cause the apparatus to access historical late lane change information corresponding to late lane changes that occurred along a second traversable map element and use transfer learning and the historical late lane change information to cause the late lane change model to generate late lane change predictions for the second traversable map element.

In an example embodiment, the late lane change prediction comprises at least one of an indication of whether late lane changes are likely to occur under the prediction scenario, a likelihood that late lane changes will occur under the prediction scenario, an expected severity of late lane changes occurring under the prediction scenario, where along the traversable map element corresponding to the prediction scenario late lane changes are expected to occur, the expected direction of late lane changes, or expected delays caused by late lane changes under the prediction scenario.

In an example embodiment, the respective late lane change feature description is an instance of labeled input data comprising input data that contextualizes the respective late lane change and label data that characterizes the respective late lane change, and an input layer of the late lane change model is configured to receive the input data.

In an example embodiment, an output layer of the late lane change model is configured to provide output characterizing a predicted lane change.

According to still another aspect of the present disclosure, an apparatus is provided. The apparatus comprises means for generating respective late lane change feature descriptions for a plurality of late lane changes, a respective late lane change feature description comprising information regarding a respective late lane change and at least one of map data, weather data, or traffic data corresponding to a respective location of the respective late lane change. The apparatus comprises means for training a late lane change model using a machine learning technique based at least in part training data comprising the respective late lane change feature descriptions. The late lane change model is trained such that the late lane change model is configured to receive an input feature description characterizing a prediction scenario corresponding to a traversable map element and provide a late lane change prediction corresponding to the prediction scenario. The late lane change prediction is configured to be used for at least one of (a) updating a digital map, (b) updating traffic data corresponding to the traversable map element, or (c) used as input for performing a navigation-related function.

According to another aspect, a method for using a late lane change model is provided. In an example embodiment, the method comprises accessing a late lane change model that was trained using a machine learning technique based at least in part on training data comprising a plurality of late lane change feature descriptions, a respective late lane change feature description comprising information characterizing a respective late lane change and at least one of map data, weather data, or traffic data corresponding to a respective location of the respective late lane change; executing the late lane change model to generate a late lane change prediction corresponding to a traversable map element of a digital map that provides a representation of the traversable network; and causing at least one of (a) the digital map to be updated based at least in part on the late lane change prediction, (b) traffic data corresponding to the traversable map element to be updated based at least in part on the late lane change prediction, or (c) a navigation-related function to be performed using at least a portion of the late lane change prediction as input.

In an example embodiment, using at least a portion of the late lane change prediction as input for performing the positioning and/or navigation-related function causes a human perceivable notification to be provided.

In an example embodiment, at least one characteristic of the human perceivable notification is determined based at least in part on an expected severity of lane change indicated by the late lane change prediction.

According to another aspect, an apparatus is provided. In an example embodiment, the apparatus comprises at least one processor and at least one memory storing computer program code. The at least one memory and the computer program code are configured to, with the processor, cause the apparatus to at least access a late lane change model that was trained using a machine learning technique based at least in part on training data comprising a plurality of late lane change feature descriptions, a respective late lane change feature description comprising information characterizing a respective late lane change and at least one of map data, weather data, or traffic data corresponding to a respective location of the respective late lane change; execute the late lane change model to generate a late lane change prediction corresponding to a traversable map element of a digital map that provides a representation of the traversable network; and cause at least one of (a) the digital map to be updated based at least in part on the late lane change prediction, (b) traffic data corresponding to the traversable map element to be updated based at least in part on the late lane change prediction, or (c) a navigation-related function to be performed using at least a portion of the late lane change prediction as input.

In an example embodiment, using at least a portion of the late lane change prediction as input for performing the positioning and/or navigation-related function causes a human perceivable notification to be provided.

In an example embodiment, at least one characteristic of the human perceivable notification is determined based at least in part on an expected severity of lane change indicated by the late lane change prediction.

According to still another aspect, a computer program product is provided. In an example embodiment, the computer program product comprises at least one non-transitory computer-readable storage medium having computer-readable program code portions stored therein. The computer-readable program code portions comprise executable portions configured, when executed by a processor of an apparatus, to cause the apparatus to access a late lane change model that was trained using a machine learning technique based at least in part on training data comprising a plurality of late lane change feature descriptions, a respective late lane change feature description comprising information characterizing a respective late lane change and at least one of map data, weather data, or traffic data corresponding to a respective location of the respective late lane change; execute the late lane change model to generate a late lane change prediction corresponding to a traversable map element of a digital map that provides a representation of the traversable network; and cause at least one of (a) the digital map to be updated based at least in part on the late lane change prediction, (b) traffic data corresponding to the traversable map element to be updated based at least in part on the late lane change prediction, or (c) a navigation-related function to be performed using at least a portion of the late lane change prediction as input.

In an example embodiment, using at least a portion of the late lane change prediction as input for performing the positioning and/or navigation-related function causes a human perceivable notification to be provided.

In an example embodiment, at least one characteristic of the human perceivable notification is determined based at least in part on an expected severity of lane change indicated by the late lane change prediction.

According to still another aspect of the present disclosure, an apparatus is provided. The apparatus comprises means for accessing a late lane change model that was trained using a machine learning technique based at least in part on training data comprising a plurality of late lane change feature descriptions. A respective late lane change feature description comprising information characterizing a respective late lane change and at least one of map data, weather data, or traffic data corresponding to a respective location of the respective late lane change. The apparatus comprises means for executing the late lane change model to generate a late lane change prediction corresponding to a traversable map element of a digital map that provides a representation of the traversable network. The apparatus comprises means for causing at least one of (a) the digital map to be updated based at least in part on the late lane change prediction, (b) traffic data corresponding to the traversable map element to be updated based at least in part on the late lane change prediction, or (c) a navigation-related function to be performed using at least a portion of the late lane change prediction as input.

BRIEF DESCRIPTION OF THE DRAWINGS

Figure 1:
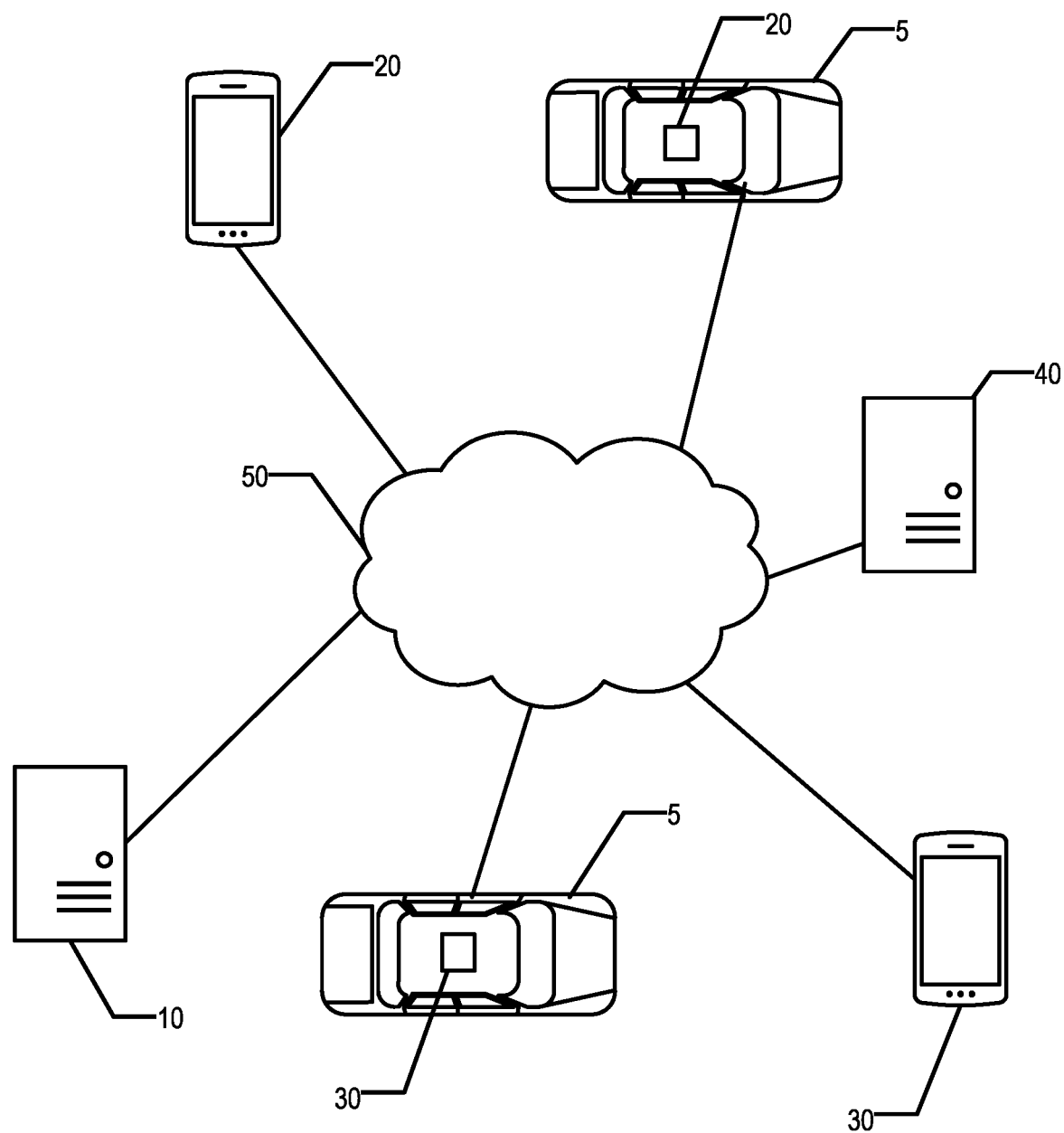
Figure 2A:
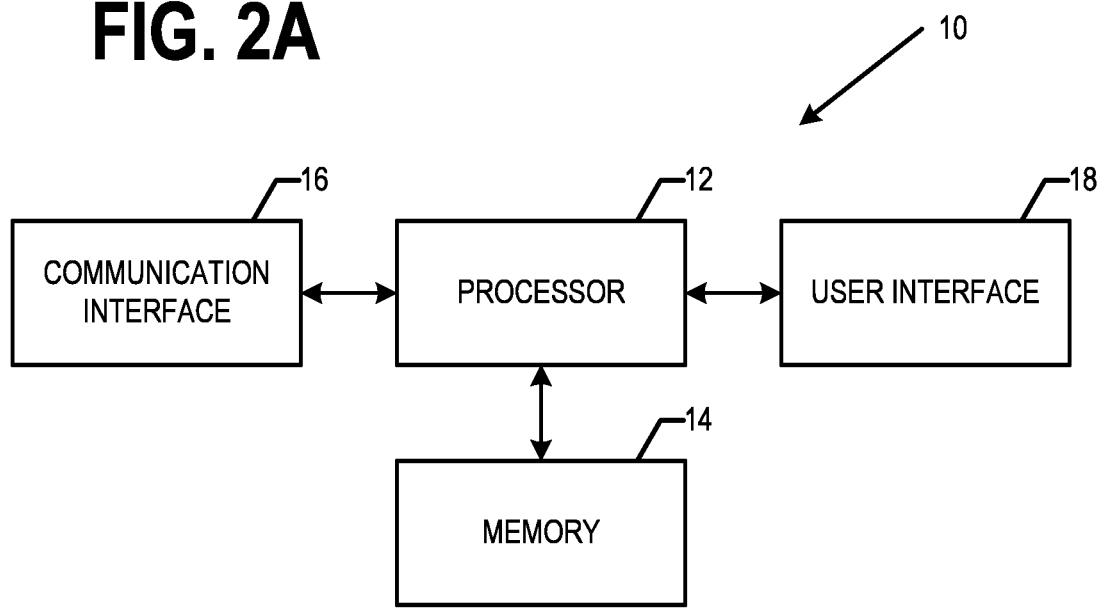
Figure 2B:
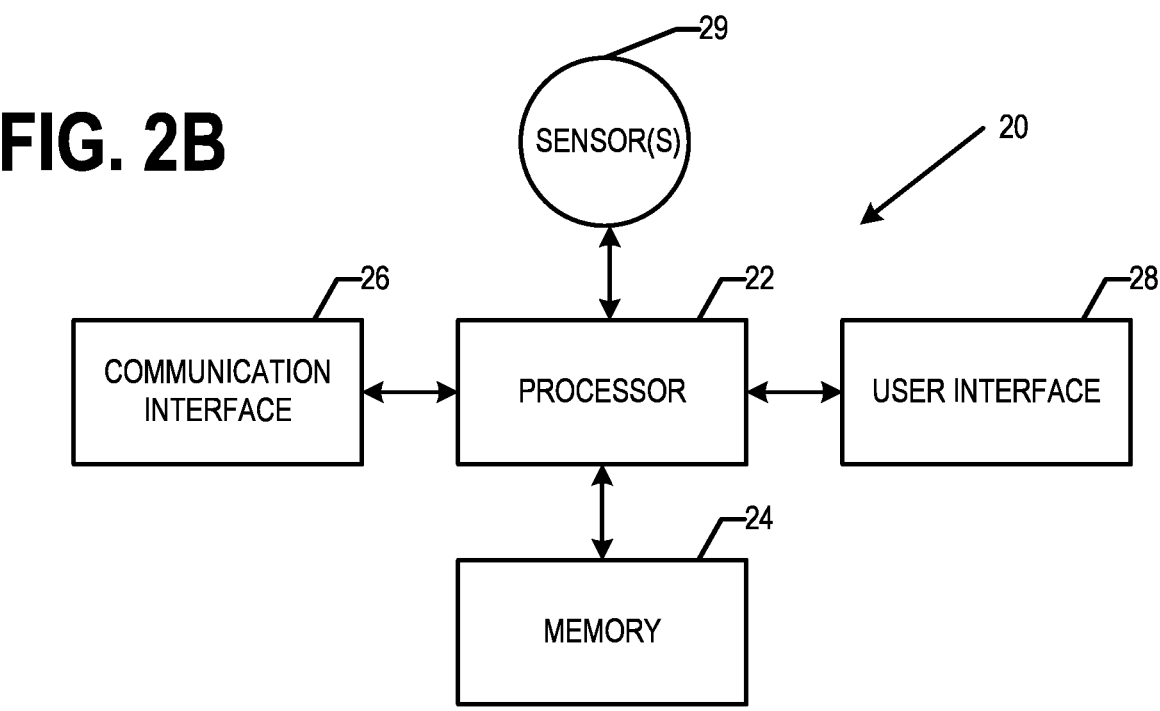
Figure 2C:
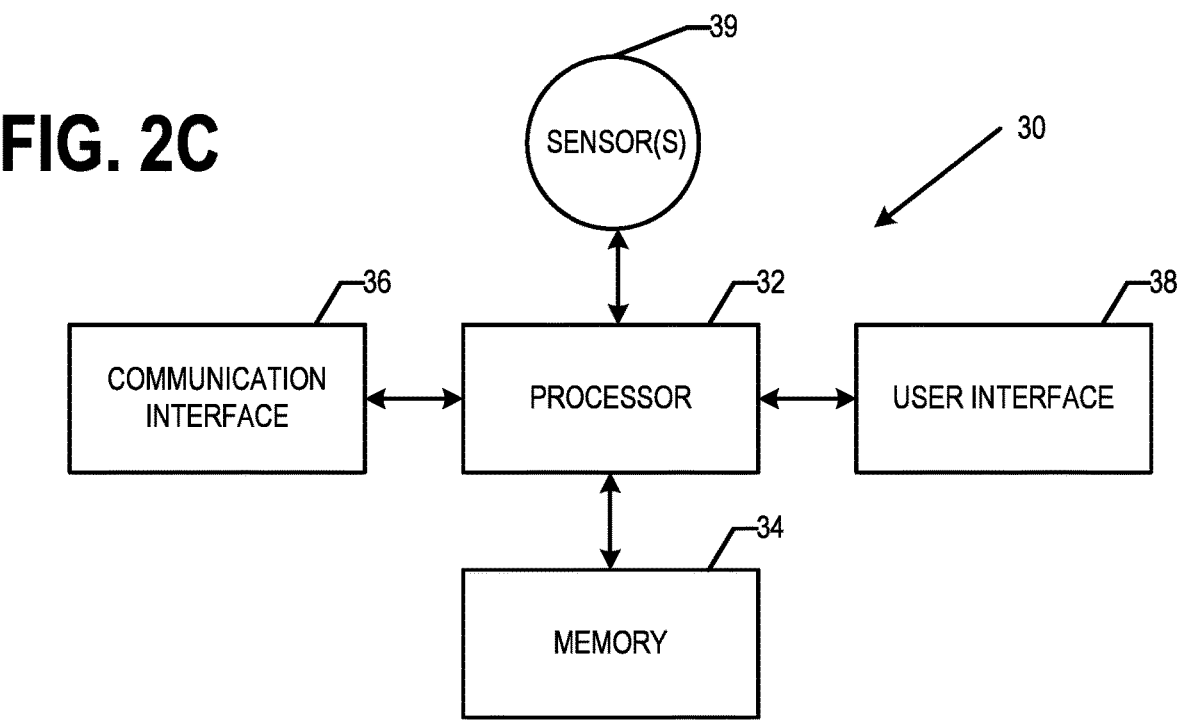
Figure 3:
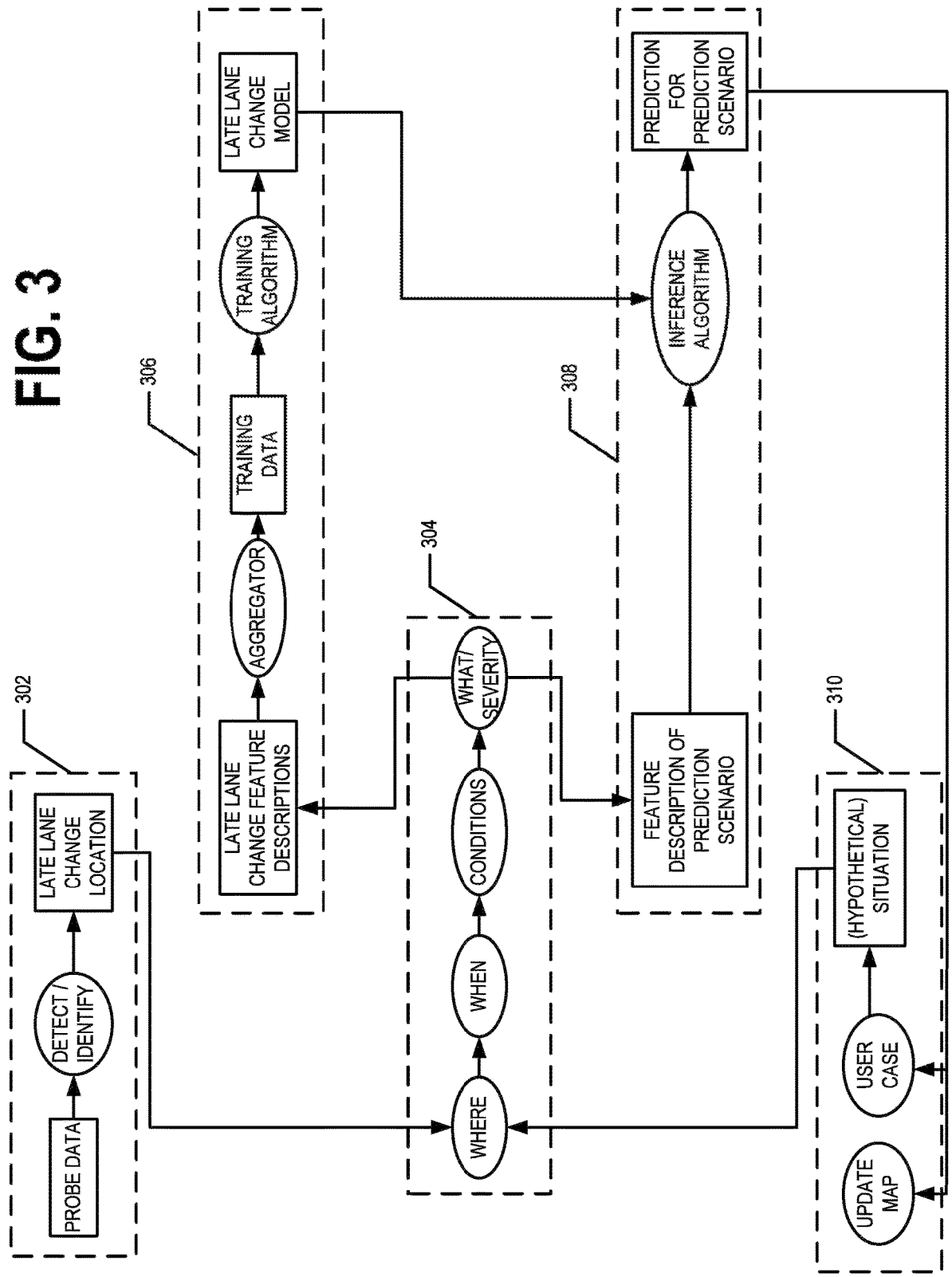
Figure 4:
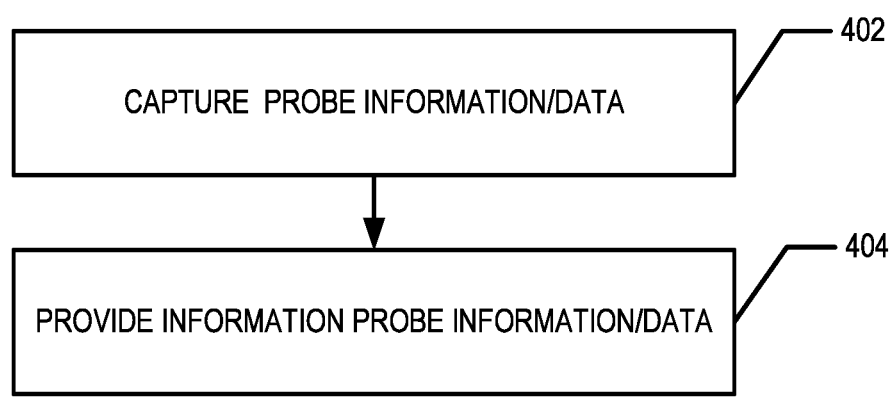
Figure 5:
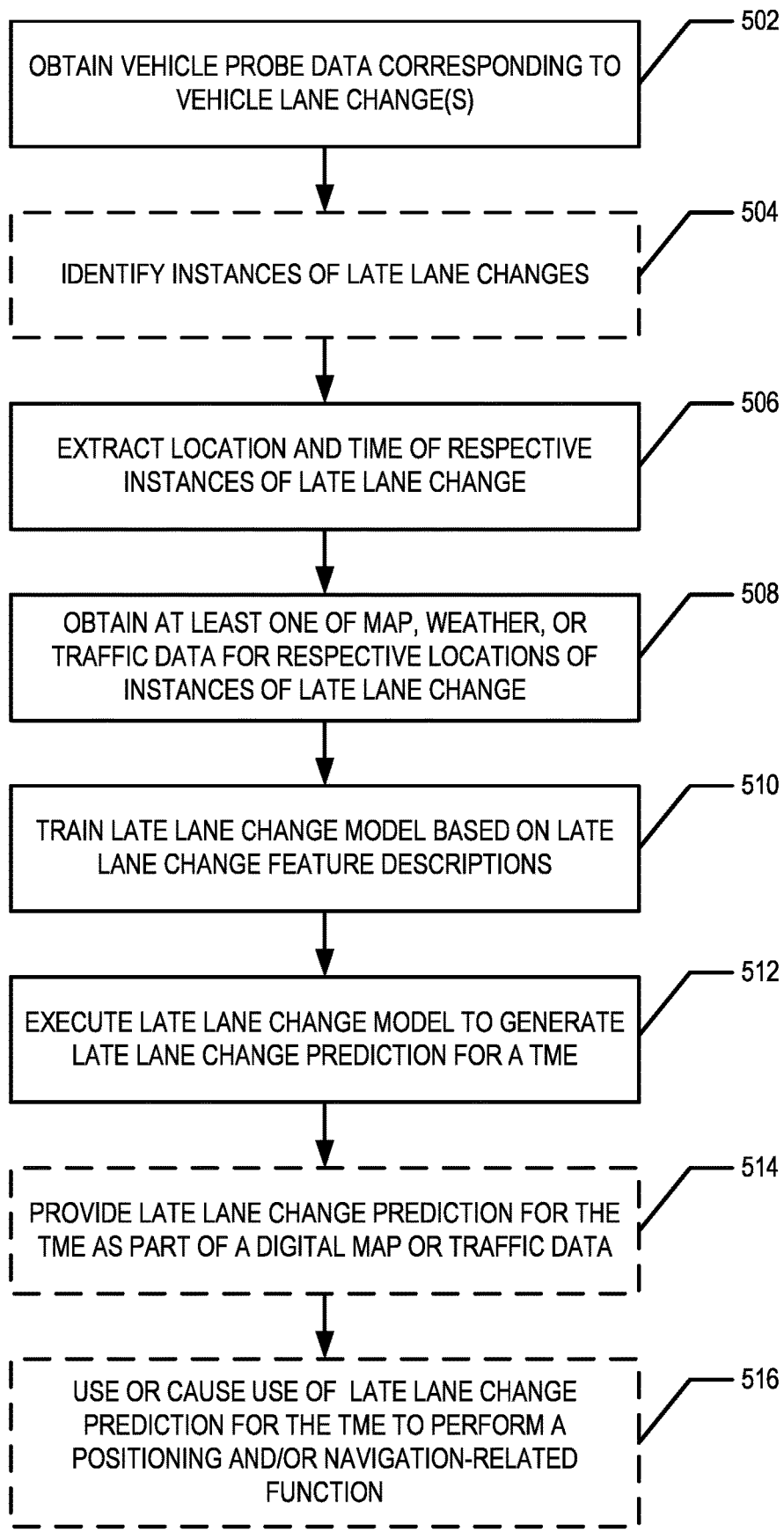
Figure 6:
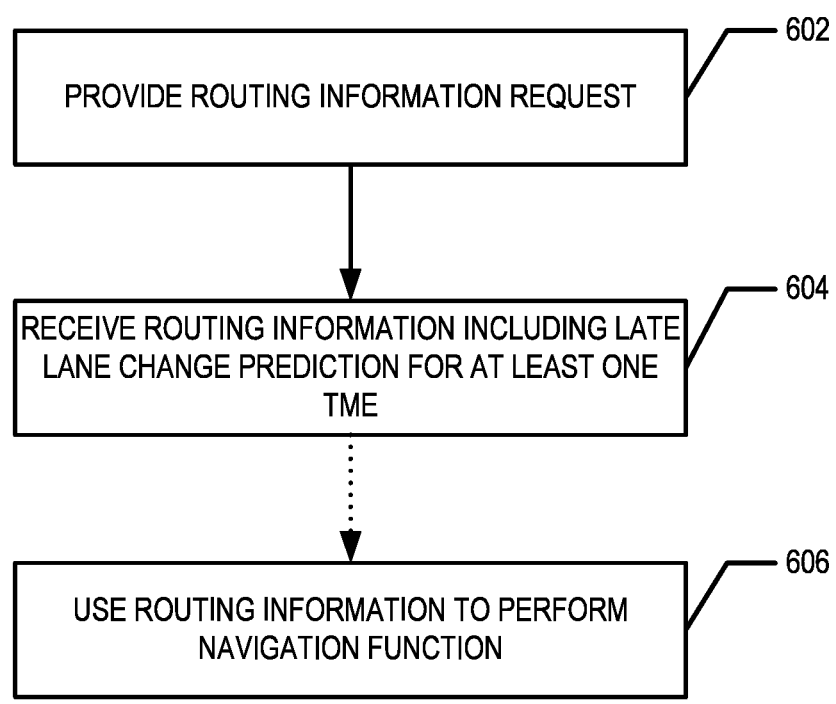

Having thus described certain example embodiments in general terms, reference will hereinafter be made to the accompanying drawings, which are not necessarily drawn to scale, and wherein:

FIG. 1 is a block diagram showing an example architecture of one exemplary embodiment;

FIG. 2A is a block diagram of a network apparatus that may be specifically configured in accordance with an example embodiment;

FIG. 2B is a block diagram of a probe apparatus that may be specifically configured in accordance with an example embodiment;

FIG. 2C is a block diagram of a mobile apparatus that may be specifically configured in accordance with an example embodiment;

FIG. 3 is a flowchart illustrating an overview of operations performed, such as by the network apparatus of FIG. 2A, in accordance with an example embodiment;

FIG. 4 is a flowchart illustrating operations performed, such as by the probe apparatus of FIG. 2B, to provide probe data, in accordance with an example embodiment;

FIG. 5 is a flowchart illustrating operations performed, such as by the network apparatus of FIG. 2A, to provide, generate and make use of late lane change predictions, in accordance with an example embodiment; and FIG. 6 is a flowchart illustrating operations performed, such as by the mobile apparatus of FIG. 2C, to provide a route information/data request and use route information/data to perform one or more navigation-related functions, in accordance with an example embodiment.

DETAILED DESCRIPTION OF SOME EXAMPLE EMBODIMENTS

I. General Overview

Various embodiments provide methods, apparatuses, systems, computer program products, and/or the like for predicting late lane changes and/or using predictions regarding late lane changes to reduce the advent of late changes and/or mitigate the effects on traffic flow on late lane changes. In various embodiments, probe data is used to identify instances of late lane change and information regarding the instances of late lane change are identified and/or extracted and then used to generate late lane change feature descriptions. A late lane change model is trained based at least in part on a plurality of late lane change feature descriptions. The late lane change model is then used to generate late lane change predictions for one or more traversable map elements (TMEs) corresponding to road segments and/or traversable lanes of road segments of at least one traversable network. The late lane change predictions are stored to a digital map in association with the corresponding TME, used as input to one or more navigation-related functions, used to provide to notifications and/or alerts to vehicles and/or vehicle operators/passengers traversing or in the vicinity of the corresponding TME, and/or the like.

In various embodiments, a late lane change is a lane change that satisfies at least one of a time until beginning of next maneuver threshold, a distance until beginning of next maneuver threshold, a lane change time/distance duration threshold, a time between announcing lane change and beginning the lane change threshold, or a statistical threshold. In various embodiments, a lane change is made by a vehicle such that the vehicle can make a next maneuver (e.g., a left or right turn, take an exit, and/or the like). In various embodiments, determining whether a lane change is late lane change is determined based on the time and/or distance required to perform the lane change after announcing the lane change (e.g., turning on a left or right turn signal) and/or the time and/or distance between the lane change and the performance of the next maneuver.

In various embodiments, determining whether a lane change is a late lane change is determined based on the lane change satisfying a statistical threshold. For example, a particular percentage (e.g., 5%, 2.5%, 1%) of lane changes that were completed distance-wise or time-wise closest to the performance of the next maneuver (e.g., taking a freeway exit, entering an intersection, and/or the like) are identified as late lane changes, in an example embodiment. In another example, in various embodiments, determining whether a lane change is a late lane change is determined based on identifying lane changes that take more time than necessary or substantially more time than a nominal lane change time (e.g., more than two standard deviations longer than an average amount of time to perform a lane change according to some measured distribution of lane change times/durations) as a late lane change. For example, the performance of a lane change may be determined to begin based on activation of a turn signal, positioning of the vehicle within the lane (e.g., based on lane makers observed by one or more sensors 29), and/or the like. The performance of the lane change may be determined to end based on determining that the vehicle is now positioned in a new lane (e.g., based on detection of the vehicle crossing lane makers observed by one or more sensors 29, based on a GNSS and/or optically determined position of the vehicle, and/or the like), the turn signal being de-activated, and/or the like. The amount of time required to perform the lane change or the time duration of the lane change is the amount of time between the time when the performance of the lane change is determined to begin and the time when the performance of the lane change is determined to end.

In various embodiments, a lane change satisfies a statistical threshold when the lane change is statistically later than other lane changes performed along the same TME and/or approaching the same intersection or takes statically significantly more time or more distance than other lane changes. In various embodiments, a lane change is determined to be a late lane change when the time duration or the distance duration is greater than a respective lane change time duration threshold or lane change distance duration threshold.

In various embodiments, when the time between performing the lane change and beginning the next maneuver is less than a time until beginning of next maneuver threshold (e.g., a minute, thirty seconds, twenty seconds, fifteen seconds, ten seconds, five seconds, two seconds, and/or the like), it is determined that the lane change is a late lane change. In various embodiments, the time until beginning of next maneuver threshold is determined based at least in part on a class associated with the TME (e.g., functional road classification and/or the like), real-time traffic conditions along the TME (e.g., current traffic volume, current average traffic speed, and/or like), historical traffic conditions along the TME (e.g., historical traffic volume, historical average traffic speed, and/or the like), the lane markings on the surface where the lane change occurred, and/or the like.

In various embodiments, when the distance between performing the lane change maneuver and beginning the next maneuver is less than a distance until beginning the next maneuver threshold (e.g., one mile, one kilometer, half a mile, half a kilometer, quarter of a mile, quarter of a kilometer, a tenth of a mile, a tenth of kilometer, and/or the like), it is determined that the lane change is a late lane change. In various embodiments, the distance until beginning of next maneuver threshold is determined based at least in part on a class associated with the TME (e.g., functional road classification and/or the like), real-time traffic conditions along the TME (e.g., current traffic volume, current average traffic speed, and/or like), historical traffic conditions along the TME (e.g., historical traffic volume, historical average traffic speed, and/or the like), location of signs providing notification of and/or information corresponding to the next maneuver, and/or the like.

In various embodiments, when the time between a left or right turn signal announcing the lane change and the performing of the lane change is greater than a time between announcing lane change and beginning the lane change threshold (e.g., a minute, thirty seconds, twenty seconds, fifteen seconds, ten seconds, five seconds, and/or the like), it is determined that the lane change is a late lane change. In various embodiments, the time between announcing lane change and beginning the lane change threshold is determined based at least in part on a class associated with the TME (e.g., functional road classification and/or the like), real-time traffic conditions along the TME (e.g., current traffic volume, current average traffic speed, and/or like), historical traffic conditions along the TME (e.g., historical traffic volume, historical average traffic speed, and/or the like), and/or the like.

In various embodiments, when an instance of late lane change is identified (e.g., based on probe data), information regarding the instance of late lane change is identified and/or extracted. For example, the information regarding the instance of late lane change may comprise data corresponding to where the late lane change occurred; a time of day, week, month, or year, when the late change occurred; traffic conditions under which the late lane change occurred; weather conditions under which the late lane change occurred; roadway geometry and/or topology corresponding to the TME where the late lane change occurred; and/or the like. In various embodiments, the information regarding the instance of late lane change is identified and/or extracted from probe data provided by the vehicle that performed the instance of late lane change, probe data provided by vehicles in the vicinity of and/or that witnessed the instance of late lane change, sensors and/or cameras along the traversable network that captured sensor data and/or images corresponding to the instance of late lane change, information provided by a weather service configured to provide weather information for a geographical area including the location of the instance of late lane change, information provided by a traffic monitoring service configured to provide traffic information for a geographical area including the location of the instance of late lane change, a digital map corresponding to a geographical area including the location of the instance of late lane change, and/or the like.

In various embodiments, the identified and/or extracted information regarding the instance of late lane change is formatted into and/or used to generate a late lane change feature description for the instance of late lane change. Late lane change feature descriptions are generated for a plurality of instances of late lane changes, in various embodiments, and used to train a late lane change model.

In various embodiments, the late lane change model is a machine-learning trained model such as a neural network, deep neural network (DNN), and/or the like. After the late lane change model is trained (e.g., based on a plurality of late lane change feature descriptions), the late lane change model is used to generate late lane change predictions for one or more TMEs.

The late lane change predictions may be used to update map data of a digital map corresponding to the one or more TMEs, used to perform one or more navigation-related functions, used to provide to notifications and/or alerts to vehicles and/or vehicle operators/passengers traversing or in the vicinity of the corresponding TME, and/or the like.

In various scenarios, the occurrence of a late lane change can have negative effects on other traffic on the TME where the late lane change occurred. For example, the late lane change may cause other vehicles along the TME to slow down so that the late lane change can be performed, cause collisions to occur, and/or the like. However, conventional navigation applications do not provide means for predicting, reducing, and/or mitigating the effects of instances of late lane change. Therefore, there exists technical problems, in the navigation-related arts regarding how to predict, reduce, and/or mitigate the effects of late lane changes.

Various embodiments provide technical solutions to these technical problems. For example, various embodiments generate late lane change feature descriptions corresponding to identified instances of late lane changes and use the late lane change feature descriptions to train a late lane change model. The late lane change model is configured to generate late lane change predictions. These late lane change predictions are then used to reduce the occurrence of late lane changes and/or mitigate the effects of late lane changes. For example, the late lane change predictions are stored to a digital map in association with the corresponding TME, used as input to one or more navigation-related functions, used to provide to notifications and/or alerts to vehicles and/or vehicle operators/passengers traversing or in the vicinity of the corresponding TME, and/or the like. For example, navigational guidance may be provided to vehicle operators to perform lane changes earlier, notifications and/or alerts may be provided to vehicle operators to be aware of other vehicles that may perform late lane changes, notify right of way maintenance crews to check the visibility of particular signs, and/or the like. Thus, various embodiments provide technical advantages that enable the prediction of when, where, and/or under what conditions late lane changes may occur such that instances of late lane changes may be reduced and/or the effects of late lane changes may be reduced.

II. Example System Architecture

FIG. 1 provides an illustration of an example system that can be used in conjunction with various embodiments of the present invention. As shown in FIG. 1, the system may include one or more network apparatuses 10, one or more probe apparatuses 20 that may be disposed on a vehicle 5, one or more mobile apparatuses 30, one or more service apparatuses 40, one or more networks 50, and/or the like.

In various embodiments, the probe apparatus 20 may be an in vehicle navigation system, vehicle control system, a mobile computing device, and/or the like. For example, a probe apparatus 20 may be an in vehicle navigation system mounted within and/or be onboard a vehicle 5 such as a motor vehicle, non-motor vehicle, automobile, car, scooter, truck, van, bus, motorcycle, bicycle, Segway, golf cart, and/or the like. In an example embodiment, the probe apparatus 20 may be a vehicle control system configured to autonomously drive a vehicle 5, assist in control of a vehicle 5, monitor various aspects of the vehicle 5 (e.g., fault conditions, motor oil status, battery charge level, fuel tank fill level, and/or the like) and/or the like. In various embodiments, a probe apparatus 20 configured to autonomously drive a vehicle 5 may perform multiple functions that are similar to those performed by a probe apparatus configured to be an ADAS (e.g., lane keeping, lane change assistance, maintaining a lane, merging, etc.). In some embodiments, a probe apparatus 20 may be onboard a personal vehicle, commercial vehicle, public transportation vehicle, fleet vehicle, and/or other vehicle. In various embodiments, the probe apparatus 20 may be a smartphone, tablet, personal digital assistant (PDA), personal computer, desktop computer, laptop, and/or other mobile computing device.

In various embodiments, the mobile apparatus 30 may be an in vehicle navigation system, vehicle control system, a mobile computing device, and/or the like. For example, a mobile apparatus 30 may be an in vehicle navigation system mounted within and/or be onboard a vehicle 5 such as a motor vehicle, non-motor vehicle, automobile, car, scooter, truck, van, bus, motorcycle, bicycle, Segway, golf cart, and/or the like. In an example embodiment, the mobile apparatus 30 may be a vehicle control system configured to autonomously drive a vehicle 5, assist in control of a vehicle 5, monitor various aspects of the vehicle 5 (e.g., fault conditions, motor oil status, battery charge level, fuel tank fill level, and/or the like) and/or the like. In various embodiments, a mobile apparatus 30 configured to autonomously drive a vehicle 5 may perform multiple functions that are similar to those performed by a mobile apparatus 30 configured to be an ADAS (e.g., lane keeping, lane change assistance, maintaining a lane, merging, etc.). In some embodiments, a mobile apparatus 30 may be onboard a personal vehicle, commercial vehicle, public transportation vehicle, fleet vehicle, and/or other vehicle. In various embodiments, the mobile apparatus 30 may be a smartphone, tablet, personal digital assistant (PDA), personal computer, desktop computer, laptop, and/or other mobile computing device. In various embodiments, a mobile apparatus 30 may be a probe apparatus 20.

In an example embodiment, the network apparatus 10 may be a server, group of servers, distributed computing system, and/or other computing system. For example, the network apparatus 10 may be in communication with a plurality of probe apparatuses 20, one or more mobile apparatuses 30, and/or the like via one or more wired or wireless networks 50. While the network apparatus 10 is generally described herein as a single computing entity, in various embodiments, the functions described herein as being performed by the network apparatus 10 may be performed by one or more of multiple network apparatuses 10.

In various embodiments, a service apparatus 40 is a computing entity operated by and/or on behalf of a weather service and/or traffic service. For example, the service apparatus 40 is configured to generate and/or provide weather data for a geographical area including a location of a respective instance of a late lane change, traffic data for the geographical area including a location of a respective instance of a late lane change, map data for a digital map corresponding to the geographical area including a location of a respective instance of a late lane change, and/or the like. In various embodiments, the service apparatus 40 is a server, group of servers, cloud-based service, and/or the like. In various embodiments, the service apparatus 40 is configured to communicate with a network apparatus 10, for example, via one or more networks 50.

In an example embodiment, a network apparatus 10 may comprise components similar to those shown in the example network apparatus 10 diagrammed in FIG. 2A. In an example embodiment, the network apparatus 10 is configured to receive and analyze a plurality of instances of probe data, generate and store historical late lane change events, generate real-time (or near real-time) late lane change events, perform lane level routing and/or navigation-related functions using one or more historical and/or real-time (or near real-time) late lane change events, receive routing information/data requests and generate and provide responses thereto, and/or the like. For example, as shown in FIG. 2A, the network apparatus 10 may comprise a processor 12, memory 14, a user interface 18, a communications interface 16, and/or other components configured to perform various operations, procedures, functions or the like described herein. In at least some example embodiments, the memory 14 is non-transitory.

In an example embodiment, a probe apparatus 20 is onboard a vehicle 5. In an example embodiment, the probe apparatus 20 may be configured to provide navigation and/or route information/data to a user (e.g., an operator of the vehicle 5). In an example embodiment, the probe apparatus 20 may be configured to autonomously drive a vehicle 5 and/or assist in control of a vehicle 5 (e.g., an ADAS) in accordance with navigation and/or route information/data. In an example embodiment, the probe apparatus 20 may be configured to gather, collect, capture, and/or the like instances of probe data as the vehicle 5 moves through the traversable network and/or a portion thereof. For example, an instance of probe data may comprise a time stamp indicating the time that the instance of probe data was gathered, collected, captured and/or the like. In an example, an instance of probe data may comprise a position and/or heading corresponding to a location and/or heading of the vehicle 5 and/or probe apparatus 20 at the time the instance of probe data was gathered, collected, captured, and/or the like. In an example embodiment, an instance of probe data may comprise information/data identifying one or more localization objects observed when the probe apparatus 20 and/or vehicle 5 was located at the position and/or heading of the instance of probe data, a distance between the probe apparatus 20 and/or vehicle 5 and at least one of the one or more localization objects when the probe apparatus 20 and/or vehicle 5 was located at the position and/or heading of the instance of probe data, and/or the like. For example, an instance of probe data may include an indicator of a type of lane marker present on the road surface at the location of the vehicle 5 when the instance of probe data was gathered, collected, captured, and/or the like. In an example embodiment, an instance of probe data comprises a trajectory identifier configured to enable the linking of instances of probe data into vehicle trajectories while still, in some embodiments, maintaining the anonymity of the probe apparatus and/or a vehicle the probe apparatus is onboard.

In an example embodiment, as shown in FIG. 2B, the probe apparatus 20 may comprise a processor 22, memory 24, a communications interface 26, a user interface 28, one or more sensors 29 (e.g., a location sensor such as a global navigation satellite system (GNSS) sensor; inertial measurement unit (IMU) sensors; camera(s); two dimensional (2D) and/or three dimensional (3D) light detection and ranging (LiDAR)(s); long, medium, and/or short range radio detection and ranging (RADAR); ultrasonic sensors; electromagnetic sensors; (near-) infrared (IR) cameras; 3D cameras;

360° cameras; fuel level sensors; vehicle system sensors (e.g., oil status sensors, tire pressure sensors, engine oil pressure sensors, coolant level sensors, engine/coolant temperature sensors, and/or other sensors that enable the probe apparatus 20 to determine one or more features of the corresponding vehicle's 5 surroundings and/or monitor the vehicle's 5 operating parameters), and/or other components configured to perform various operations, procedures, functions or the like described herein. In at least some example embodiments, the memory 24 is non-transitory.

In an example embodiment, a mobile apparatus 30 is onboard a vehicle 5. In an example embodiment, the mobile apparatus 30 may be configured to provide navigation and/or route information/data to a user (e.g., an operator of the vehicle 5). In an example embodiment, the mobile apparatus 30 may be configured to autonomously drive a vehicle 5 and/or assist in control of a vehicle 5 (e.g., an ADAS) in accordance with navigation and/or route information/data. In an example embodiment, the mobile apparatus 30 may be configured to generate and provide routing information/data requests, receive responses to routing information/data requests, perform one or more navigation-related functions based on and/or using navigation and/or route information/ data provided in response to routing information/data requests, and/or the like.

In an example embodiment, as shown in FIG. 2C, the mobile apparatus 30 may comprise a processor 32, memory 34, a communications interface 36, a user interface 38, one or more sensors 39 (e.g., a location sensor such as a GNSS sensor; IMU sensors; camera(s); two dimensional (2D) and/or three dimensional (3D) light detection and ranging (LiDAR)(s); long, medium, and/or short range radio detection and ranging (RADAR); ultrasonic sensors; electromagnetic sensors; (near-) infrared (IR) cameras; 3D cameras; 360° cameras; fuel level sensors; vehicle system sensors (e.g., oil status sensors, tire pressure sensors, engine oil pressure sensors, coolant level sensors, engine/coolant temperature sensors, and/or other sensors that enable the mobile apparatus 30 to determine one or more features of the corresponding vehicle's surroundings and/or monitor the vehicle's 5 operating parameters), and/or other components configured to perform various operations, procedures, functions or the like described herein. In at least some example embodiments, the memory 34 is non-transitory.

In various embodiments, a service apparatus 40 comprises one or more components similar to those of a network apparatus 10. For example, a service apparatus 40 comprises a processor, memory, a user interface, a communications interface, and/or other components configured to perform various operations, procedures, functions or the like described herein, in various embodiments.

Each of the components of the system may be in electronic communication with, for example, one another over the same or different wireless or wired networks 50 including, for example, a wired or wireless Personal Area Network (PAN), Local Area Network (LAN), Metropolitan Area Network (MAN), Wide Area Network (WAN), 5G, cellular network, and/or the like. In some embodiments, a network 50 may comprise the automotive cloud, digital transportation infrastructure (DTI), radio data system (RDS)/high definition (HD) radio or other digital radio system, and/or the like. For example, a probe apparatus 20 may be in communication with a network apparatus 10 via the network 50. For example, a probe apparatus may communicate with the network apparatus 10 via a network, such as the Cloud. For example, the Cloud may be a computer network that provides shared computer processing resources and data to computers and other devices connected thereto. In various embodiments, a mobile apparatus 30 may communicate with the network apparatus 10 via a network, such as the Cloud.

Certain example embodiments of the network apparatus 10, probe apparatus 20, and the mobile apparatus 30 are described in more detail below with respect to FIGS. 2A, 2B, and 2C.

III. Exemplary Operation of an Example Embodiment

Various embodiments provide methods, apparatuses, systems, computer program products, and/or the like for predicting late lane changes and/or using predictions regarding late lane changes to reduce the advent of late changes and/or mitigate the effects on traffic flow on late lane changes. In various embodiments, probe data is used to identify instances of late lane change and information regarding the instances of late lane change are identified and/or extracted and then used to generate late lane change feature descriptions. A late lane change model is trained based at least in part on a plurality of late lane change feature descriptions. The late lane change model is then used to generate late lane change predictions for one or more traversable map elements (TMEs) corresponding to road segments and/or traversable lanes of road segments of at least traversable network. The late lane change predictions are stored to a digital map in association with the corresponding TME, used as input to one or more navigation-related functions, used to provide to notifications and/or alerts to vehicles and/or vehicle operators/passengers traversing or in the vicinity of the corresponding TME, and/or the like.

In various embodiments, a late lane change is a lane change that satisfies at least one of a time until beginning of next maneuver threshold, a distance until beginning of next maneuver threshold, or a time between announcing lane change and beginning the lane change threshold. In various embodiments, a lane change is made by a vehicle such that the vehicle can make a next maneuver (e.g., a left or right turn, take an exit, and/or the like). In various embodiments, determining whether a lane change is late lane change is determined based on the time and/or distance required to perform the lane change after announcing the lane change (e.g., turning on a left or right turn signal) and/or the time and/or distance between the lane change and the performance of the next maneuver.

In various embodiments, when the time between performing the lane change and beginning the next maneuver is less than a time until beginning of next maneuver threshold (e.g., a minute, thirty seconds, twenty seconds, fifteen seconds, ten seconds, five seconds, two seconds, and/or the like), it is determined that the lane change is a late lane change. In various embodiments, the time until beginning of next maneuver threshold is determined based at least in part on a class associated with the TME (e.g., functional road classification and/or the like), real-time traffic conditions along the TME (e.g., current traffic volume, current average traffic speed, and/or like), historical traffic conditions along the TME (e.g., historical traffic volume, historical average traffic speed, and/or the like), the lane markings on the surface where the lane change occurred, and/or the like.

In various embodiments, when the distance between performing the lane change maneuver and beginning the next maneuver is less than a distance until beginning the next maneuver threshold (e.g., one mile, one kilometer, half a mile, half a kilometer, quarter of a mile, quarter of a kilometer, a tenth of a mile, a tenth of kilometer, and/or the like), it is determined that the lane change is a late lane change. In various embodiments, the distance until beginning of next maneuver threshold is determined based at least in part on a class associated with the TME (e.g., functional road classification and/or the like), real-time traffic conditions along the TME (e.g., current traffic volume, current average traffic speed, and/or like), historical traffic conditions along the TME (e.g., historical traffic volume, historical average traffic speed, and/or the like), location of signs providing notification of and/or information corresponding to the next maneuver, and/or the like.

In various embodiments, when the time between a left or right turn signal announcing the lane change and the performing of the lane change is greater than a time between announcing lane change and beginning the lane change threshold (e.g., a minute, thirty seconds, twenty seconds, fifteen seconds, ten seconds, five seconds, and/or the like), it is determined that the lane change is a late lane change. In various embodiments, the time between announcing lane change and beginning the lane change threshold is determined based at least in part on a class associated with the TME (e.g., functional road classification and/or the like), real-time traffic conditions along the TME (e.g., current traffic volume, current average traffic speed, and/or like), historical traffic conditions along the TME (e.g., historical traffic volume, historical average traffic speed, and/or the like), and/or the like.

Methods, apparatus, systems, and computer program products are provided in accordance with an example embodiment in detect and/or identify instances of late lane changes, generate late lane change predictions by training a late lane change model using information corresponding to the detected and/or identified instances of late lane changes, and use the late lane change predictions to perform navigation-related functions using late lane change predictions and/or the like. In an example embodiment, late lane change predictions are used to identify changes to the traversable network, and/or the like (e.g., a road sign providing information about an upcoming highway exit becoming obscured by foliage, missing, and/or the like).

Various embodiments are directed to using late lane change predictions when performing routing and/or navigation-related functions. In various embodiments, a machine learning-trained late lane change model is used to generate the late lane change prediction(s). In various embodiments, the late lane change model is trained based on training data comprising late lane change feature descriptions corresponding to detected and/or identified instances of late lane change. The late lane change model is further configured to identify and/or predict scenarios (where; when; and/or under what weather, traffic, and/or road conditions) under which late lane changes are likely to occur. For example, the late lane change model may generate and/or provide late lane change predictions for one or more TMEs that may be used to perform navigation-related functions; provide warnings, alerts, and/or notifications regarding the likelihood of late lane changes along a TME to operators (e.g., human or automatic vehicle systems) of vehicles; and/or the like.

In an example embodiment, a late lane change model is a machine learning-trained model and/or DNN configured and/or trained to receive input comprising late lane change feature descriptions. In various embodiments, the late lane change feature descriptions include information/data that describes where an identified instance of a corresponding late lane change happened. For example, the late lane change feature may include a TME identifier identifying a TME along which the identified instance of late lane change occurred, geometry and/or topology information for a TME along which the identified instance of late lane change occurred, map data from a digital map corresponding to a TME along which the late lane change occurred, geometry and/or topology and/or map data corresponding to an intersection near which the identified instance of late lane change occurred, and/or the like. In various embodiments, the late lane change feature description comprises weather information/data corresponding to when and where the identified instance of late lane change occurred, traffic data corresponding to when and where the identified instance of late lane change occurred, and/or the like.

In various embodiments, the information/data provided by a late lane change feature description is determined based on one or more of probe data captured and/or provided by a probe apparatus 20 that witnessed the late lane change (e.g., is onboard the vehicle 5 that performed the late lane change and/or was in view of the late lane change), information/data accessed from a digital map (e.g., stored by network apparatus 10 and/or service apparatus 40), information/data accessed and/or received from a weather service and/or traffic service (e.g., via communication with service apparatus 40), and/or the like. In various embodiments, the late lane change feature description includes information describing and/or characterizing the late lane change itself, such as one or more of a time of day/week/month/year when the instance of late lane change occurred; when and/or where the instance of late lane change started; time duration of the instance of late lane change; length duration of the instance of late lane change; when and/or where the instance of late lane change was completed, number of vehicles impacted by the instance of late lane change; speed of the vehicle before, after, and/or during the instance of late lane change; weather conditions during the instance of late lane change; curvature of a TME representing at least a portion of a road segment where the instance of late lane change occurred, number of lanes of the road segment on which the instance of late lane change occurred; visibility information for the location where the instance of late lane change occurred; and/or the like. For example, the late lane change feature description corresponding to the instance of late lane change comprises information/data configured to characterize and/or contextualize the instance of late lane change.

In various embodiments, a network apparatus 10 and/or a service apparatus 40 stores historical late lane change information/data. in various embodiments historical late lane change information/data associated with a TME describes historical parameters for late lane changes along the TME. For example, the historical late lane change information identifies where along the TME late lane changes historically have occurred, weather conditions under which late lane changes along the TME have historically occurred, traffic conditions under which late lane changes along the TME have historically occurred, times of day/week/month/year late lane changes along the TME have historically occurred, and/or the like. In various embodiments, a late lane change model may be trained corresponding to a particular TME such that the late lane change model is configured to provide late lane change predictions tailored to the particular TME. In an example embodiment, a late lane change model may be trained to use historical late lane change information/data to tailor late lane change predictions to traffic patterns of the particular TME. As used herein, historical late lane change information/data is late lane change information/data that was previously captured, generated, processed, and/or the like. For example, the network apparatus 10 may generate and/or process information/data (e.g., probe data, map information/data, weather information/data, traffic information/data, and/or the like corresponding to instances of late lane changes) and store the processed information/data as historical late lane change information/data. In an example embodiment, the historical late lane change information/data comprises late lane change feature descriptions. In an example embodiment, the historical late lane change information/data is information/data that characterizes and/or contextualizes when and/or under what conditions late lane changes typically occur along the respective TME. For example, the historical late lane change data is generally not real-time data.

In various embodiments, current late lane change data comprises information/data corresponding to identified late lane changes along a respective TME that occurred within a current epoch and/or one or more of map data, weather data, and/or traffic data corresponding to the respective TME during the current epoch that may be used (e.g., by the late lane change model) to predict whether late lane changes are likely during the current epoch. As used herein, a current epoch is a time window of a defined temporal length (e.g., ten minutes, fifteen minutes, twenty minutes, and/or the like).

FIG. 3 is a block diagram illustrating a high-level overview of data flow, in accordance with an example embodiment. For example, as shown by block/module 302, probe data may be received and/or access from memory and processed to detect and/or identify instances of late lane change encoded by the probe data. The location of the identified and/or detected instances of late lane change may be extracted from the probe data.

As shown by block/module 304, the information/data used to generate the respective late lane change feature descriptions for the identified and/or detected instances of late lane change are accessed and/or obtained. For example, a location of an instance of late lane change and a time of the instance of late lane change are extracted from corresponding probe data. The time and location of the instance of late lane change is used to access conditions (e.g., map data, weather conditions (e.g., visibility, wet road surface, partially flooded road surface, snowy road surface, icy road surface, black ice on road surface, dry road surface, precipitation, illumination levels (clear day/cloudy day, heavily cloudy day, night), cloud level, present or absence of fog, and/or the like), traffic conditions (e.g., light traffic, moderate traffic, heavy traffic, standstill traffic, free flow ratio (e.g., ratio of observed average speed along the TME to free flow speed along the TME), speed differential between lanes, speed distribution along the TME, statistical measures of the speed distribution along the TME, and/or the like).

In an example embodiment, a severity of the instance of late lane change is also determined. In various embodiments, the severity of an instance of late lane change is determined based at least in part on how many other vehicles were affected by the instance of late lane change and to what extent (how much did their speed change, were they involved in a collision, how hard was the brake applied, etc.) the other vehicles were affected by the instance of late lane change. In various embodiments, the severity of the instance of late lane change may be determined on and/or from a continuous or discrete numerical scale or classification. In various embodiments, the scale and/or classification of the severity of the instance of late lane change may be a one dimensional scale and/or classification or a multi-dimensional scale or classification. For example, the severity of the instance of late lane change may be determined and/or classified based on one or more of whether the vehicle that performed the late lane change was violating one or more traffic rules (e.g., performing an illegal maneuver, speeding, crossing a continuous or semi-continuous line, and/or the like), passing too close to other vehicles (e.g., as determined based on proximity sensors of one or more vehicles as indicated by various instances of probe data identified based on location and time), making dangerous trajectories, causing other vehicles to brake, causing emergency or high braking (e.g., braking that is greater than a threshold level of breaking), causing collisions, causing other vehicles to have to move out of their travel lane, and/or the like.

Block/module 306 is representative of learning phase. For example, based on the information/data characterizing and contextualizing respective instances of late lane change determined, obtained, accessed, and/or generated during block/module 304, respective late lane change feature descriptions are generated for the respective instances of late lane changes.

In various embodiments, a late lane change feature description is an instance of labelled data where the information contextualizing the late lane change is configured as input to the late lane change model and the information characterizing the late lane change is configured as the label. For example, the late lane change model is trained to receive as input information describing the context of a prediction scenario (e.g., when, where, weather conditions, road geometry/topology, traffic conditions, and/or the like) and predict characteristics of late lane changes that would occur (e.g., how likely it is a late lane change would occur, expected characteristics of a late lane change, and/or the like) under such context. For example, an input layer of the late lane change model is configured to receive contextualizing information for a scenario (e.g., a scenario in which a late lane change was observed and/or a prediction scenario) as input. The output layer of the late lane change model is configured to provide output that provides a (predicted) characterization a lane change for the scenario described by the contextualizing information provided as input. The late lane change model may further comprise one or more hidden layers configured to transform the input into the output based on the architecture of the late lane change model and (learned) weights and/or parameters of the late lane change model.

An aggregator aggregates, combines and/or organizes the late lane change feature descriptions into one or more sets of training data. A machine learning training algorithm is then applied to train the late lane change model based on at least one of the one or more sets of training data. This results in the late lane change model being trained.

The trained late lane change model may be used as an inference engine, used to determine an inference algorithm, and/or used to generate/provide input to an inference algorithm. The late lane change model and/or and inference algorithm uses labeled data of identified late lane changes to learn to predict the likelihood and, possibly, severity of late lane changes for prediction scenarios. The inference algorithm is used as part of block/module 308. For example, the block/module 304 may be used to provide information/data used to generate one or more late lane change feature descriptions of prediction scenarios. A late lane change feature description for a prediction scenario is provided as input to the inference algorithm and the inference algorithm generates and/or provides output used to generate a prediction for the prediction scenario.

As indicated by block/module 310, the prediction for the prediction scenario is used to update a digital map corresponding to a geographical region including the respective TME such that the prediction may be as input to one or more navigation-related functions, used to provide to notifications and/or alerts to vehicles and/or vehicle operators/passengers traversing or in the vicinity of the corresponding TME, and/or the like. In various embodiments, late lane change predictions may be used to inform new and/or additional user cases for determining hypothetical situations, for example, for which predictions may be determined. For example, block/module 304 may be used to generate, obtain, access, and/or the like information to characterize and/or contextualize a (hypothetical) situation such that a corresponding feature description may be generated and a corresponding late lane change prediction determined and/or generated. navigation-related function A. Exemplary Operation of Probe Apparatus In various embodiments, a probe apparatus 20 is onboard a vehicle 5 that is traversing at least a portion of a traversable network. In various embodiments, one or more sensors 29 are onboard the vehicle 5 and are in communication with the probe apparatus 20. In an example embodiment, the traversable network is represented by a digital map (e.g., possibly in the form of a geographic database). In various embodiments, the probe apparatus 20 captures instances of probe data via the one or more sensors 29 as the vehicle 5 traverses the at least a portion of the traversable network. In an example embodiment, the probe apparatus 20 may capture instances of probe data periodically based on time (e.g., every second, every ten seconds, every thirty seconds, every minute, and/or the like) and/or distance traveled (e.g., every meter, ten meters, fifty meters, hundred meters, 250 meters, and/or the like). The probe apparatus 20 may be configured to provide one or more instances of probe data via a network 50 such that a network apparatus 10 receives the one or more instances of probe data.

FIG. 4 provides a flowchart illustrating operations performed, such as by the probe apparatus 20 of FIG. 2B to provide one or more instances of probe data. Starting at step/operation 402, an instance of probe data is captured. For example, as the vehicle 5 traverses at least a portion of the traversable network, one or more sensors 29 may capture sensor information/data and communicate the sensor information/data to the probe apparatus 20. For example, the probe apparatus 20 may capture sensor information/data. For example, the probe apparatus 20 may comprise means, such as the processor 22, memory 24, sensors 29, and/or the like, for capturing and/or generating probe data. In various embodiments, an instance of probe comprises location information indicating where the instance of probe data was captured and a timestamp indicating when the instance of probe data was captured. For example, in various embodiments, the probe apparatus 20 determines location information/data indicating a location and/or heading or pose of the vehicle 5 and/or the probe apparatus 20 when the sensor information/data was captured and a timestamp corresponding to the date and/or time at which the sensor information/data was captured. For example, the vehicle apparatus 20 may determine location information/data for the vehicle 5 and/or the probe apparatus 20 based on GNSS information/data, IMU sensor information/data, visual odometry (e.g., based on one or more digital images), and/or other localization techniques and/or a combination thereof. In various embodiments, the probe apparatus 20 comprises and/or is communication with an apparatus comprising a clock such that the probe apparatus 20 may determine a timestamp corresponding to the date and/or time at which the sensor information/data is captured.

In various embodiments, the instance of probe data further comprises sensor information/data. In various embodiments, the sensor information/data describes at least a portion of the environment surrounding the vehicle 5. For example, the sensor information/data may comprise GNSS information/data, digital images, lidar point clouds, radar point clouds, ultrasonic information/data, electromagnetic information/data, thermal information/data, and/or the like. In various embodiments, the instance of probe data comprises the location information/data.

In various embodiments, an instance of probe data comprises a respective timestamp, trajectory identifier, location information/data, speed of the vehicle 5 at the date and/or time indicated by the timestamp, one or more other elements of the sensor information/data describing at least a portion of the environment surrounding the vehicle 5 at the date and/or time indicated by the timestamp, and/or the like.

At step/operation 404, the instance of probe data is provided. For example, the probe apparatus 20 may provide the instance of probe data such that a network apparatus 10 receives the instance of probe data. For example, the probe apparatus 20 may comprise means, such as processor 22, memory 24, communications interface 26, and/or the like, for providing an instance of probe data such that the network apparatus 10 receives the instance of probe data. For example, the probe apparatus may repeatedly, such as regularly and/or periodically (e.g., based on a time and/or travel distance trigger), provide one or more instances of probe data.

In various embodiments, the probe apparatus 20 provides a sequence of instances of probe data corresponding to a trajectory of the probe apparatus 20 through at least a portion of the traversable network. In various embodiments, the trajectory of the probe apparatus 20 includes one or more lane changes. In various embodiments, the instances of probe data may comprise an indication of an identified lane change (e.g., based on a change in lateral position of the probe apparatus 20 along the road segment (e.g., with respect to the road segment centerline, a lane centerline, and/or the like provided by a digital map), the crossing of a lane marking line, and/or the like).

In various embodiments, a network apparatus 10 is configured to receive and/or obtain instances of probe data generated by one or more probe apparatuses 20, detect and/or identify lane changes in trajectories corresponding to the instances of probe data, detect and/or identify late changes in the trajectories corresponding to the instances of probe data that are late lane changes, and/or the like.

B. Exemplary Operation of a Network Apparatus

FIG. 5 provides a flowchart illustrating various processes, procedures, operations, and/or the like that may be performed by a network apparatus 10, for example, to provide late lane change predictions and use the late lane change predictions to update a digital map and/or otherwise perform one or more navigation-related functions based at least in part on a late lane change prediction.

Starting at step/operation 502, the network apparatus 10 obtains probe data corresponding to vehicle lane changes. For example, the network apparatus 10 comprises means, such as processor 12, memory 14, communications interface 16, user interface 18, and/or the like, for obtaining probe data. In various embodiments, the probe data is obtained by receiving the probe data (e.g., via communications interface 16). In various embodiments, the probe data is obtained by accessing the probe data from memory 14.

In various embodiments, the obtained probe data comprises a plurality of instances of probe data captured and/or provided by a plurality of probe apparatuses 20 and/or corresponding to a plurality of trajectories through respective portions of the traversable network. In various embodiments, an instance of probe data comprises a respective timestamp, trajectory identifier, location information/data, speed of the vehicle 5 at the date and/or time indicated by the timestamp, one or more other elements of the sensor information/data describing at least a portion of the environment surrounding the vehicle 5 at the date and/or time indicated by the timestamp, and/or the like.

In various embodiments, the obtained probe data comprises a plurality of instances of probe data that correspond to a same trajectory of a respective vehicle 5 traversing at least a portion of the traversable network. For example, the obtained probe data may be organized into a plurality of time-ordered sequences of probe data with each sequence corresponding to at least a portion of a trajectory of a respective vehicle 5. For example, the obtained probe data comprises a plurality of trajectories formed as time-ordered sequences of instances of probe data.

At step/operation 504, the network apparatus 10 processes the obtained probe data to identify instances of late lane changes. For example, the trajectories of the obtained probe data may be processed to identify instances of late lane changes (e.g., performed and/or witnessed by the probe apparatus 20 that generated the corresponding instances of probe data). For example, the network apparatus 10 comprises means, such as processor 12, memory 14, and/or the like, for processing the obtained probe data to identify instances of late lane changes.

In various embodiments, the trajectories of the obtained probe data are processed to identify instances of lane changes. The identified instances of lane changes are then processed to identify instances of lane changes that satisfy at least one late lane change criteria.

In various embodiments, an instance of lane change satisfies at least one late lane change criteria when the instance of lane change satisfies a time until beginning of next maneuver threshold requirement, a distance until beginning of next maneuver threshold requirement, or a time between announcing lane change and beginning the lane change threshold requirement. For example, in various scenarios, a lane change is made by a vehicle such that the vehicle can make a next maneuver (e.g., a left or right turn, take an exit, and/or the like). In various embodiments, determining whether a lane change is late lane change is determined based on the time and/or distance required to perform the lane change after announcing the lane change (e.g., turning on a left or right turn signal) and/or the time and/or distance between the lane change and the performance of the next maneuver.

In various embodiments, when the time between performing the lane change and beginning the next maneuver is less than a time until beginning of next maneuver threshold (e.g., a minute, thirty seconds, twenty seconds, fifteen seconds, ten seconds, five seconds, two seconds, and/or the like), it is determined that the instance of lane change satisfies at least one late lane change criteria and is an instance of late lane change. In various embodiments, the time until beginning of next maneuver threshold is determined based at least in part on a class associated with the TME (e.g., functional road classification and/or the like), real-time traffic conditions along the TME (e.g., current traffic volume, current average traffic speed, and/or like), historical traffic conditions along the TME (e.g., historical traffic volume, historical average traffic speed, and/or the like), the lane markings on the surface where the lane change occurred, and/or the like.

In various embodiments, when the distance between performing the lane change maneuver and beginning the next maneuver is less than a distance until beginning the next maneuver threshold (e.g., one mile, one kilometer, half a mile, half a kilometer, quarter of a mile, quarter of a kilometer, a tenth of a mile, a tenth of kilometer, and/or the like), it is determined that the instance of lane change satisfies at least one late lane change criteria and is an instance of late lane change. In various embodiments, the distance until beginning of next maneuver threshold is determined based at least in part on a class associated with the TME (e.g., functional road classification and/or the like), real-time traffic conditions along the TME (e.g., current traffic volume, current average traffic speed, and/or like), historical traffic conditions along the TME (e.g., historical traffic volume, historical average traffic speed, and/or the like), location of signs providing notification of and/or information corresponding to the next maneuver, and/or the like.

In various embodiments, when the time between a left or right turn signal announcing the lane change and the performing of the lane change is greater than a time between announcing lane change and beginning the lane change threshold (e.g., a minute, thirty seconds, twenty seconds, fifteen seconds, ten seconds, five seconds, and/or the like), it is determined that the instance of lane change satisfies at least one late lane change criteria and is an instance of late lane change. In various embodiments, the time between announcing lane change and beginning the lane change threshold is determined based at least in part on a class associated with the TME (e.g., functional road classification and/or the like), real-time traffic conditions along the TME (e.g., current traffic volume, current average traffic speed, and/or like), historical traffic conditions along the TME (e.g., historical traffic volume, historical average traffic speed, and/or the like), and/or the like.

At step/operation 506, the network apparatus 10 extracts information corresponding to respective instances of late lane change from the obtained probe data. For example, information characterizing respective instances of late lane change are extracted from the obtained probe data. In various embodiments, the information corresponding to an instance of late lane change that is extracted from corresponding instances of probe data include one or more a time of day/week/month/year when the instance of late lane change occurred; when and/or where the instance of late lane change started; time duration of the instance of late lane change; length duration of the instance of late lane change; when and/or where the instance of late lane change was completed; number of vehicles impacted by the instance of late lane change (e.g., determined based on trajectories corresponding to other vehicles in the vicinity of the instance of late lane change); speed of the vehicle before, after, and/or during the instance of late lane change; and/or the like.

At step/operation 508, the network apparatus 10 obtains information contextualizing respective instances of late lane changes. In various embodiments, the information contextualizing an instance of late lane change comprises at least one of map data, weather data, or traffic data corresponding to the location and/or time of a respective instance of late lane change. For example, the network apparatus 10 comprises means, such as processor 12, memory 14, communication interface 16, user interface 18, and/or the like, for obtaining information contextualizing respective instances of late lane change (e.g., at least one of map data, weather data, or traffic data corresponding to the location and/or time of the respective instance of late lane change). In various embodiments, for information contextualizing a lane change that is time sensitive (e.g., weather data, traffic data, and/or the like) the information is obtained that corresponds to a time period that includes and/or corresponds to when the late lane change occurred. For example, for each of the identified instances of late lane change, the network apparatus 10 determines weather conditions during the respective instance of late lane change; curvature of a TME representing at least a portion of a road segment where the respective instance of late lane change occurred, number of lanes of the road segment on which the respective instance of late lane change occurred; visibility information for the location where the respective instance of late lane change occurred; traffic conditions at the location and time the respective instance of late lane change occurred; and/or the like. In an example embodiment, the traffic data may comprise traffic data determined based on analyzing and/or processing one or more digital image streams captured by traffic cameras. For example, a digital image stream captured by a traffic camera may be processed to identify brake lights turning on in response to an instance of late lane change to determine a number of vehicles affected by the instance of late lane change and/or the severity of the instance of late lane change.

In various embodiments, the network apparatus 10 obtains the at least one of map data, weather data, or traffic data corresponding to the location and/or time of a respective instance of late lane change by accessing the data from memory 14. For example, an application program interface (API) corresponding to a geographic, weather, or traffic database management application may be used to access the at least one of map data, weather data, or traffic data corresponding to the location and/or time of a respective instance of late lane change by accessing the data from memory 14.

In various embodiments, the network apparatus 10 obtains the at least a portion of the at least one of map data, weather data, or traffic data corresponding to the location and/or time of a respective instance of late lane change from a service apparatus 40 (e.g., via communications interface 16). For example, the network apparatus 10 may request at least one of map data, weather data, or traffic data from the service apparatus 40 (e.g., via an appropriate API call) and receive the requested data in response to the request (e.g., via an API response call).

At step/operation 510, the network apparatus 10 trains the late lane change model. For example, the network apparatus 10 comprises means, such as processor 12, memory 14, and/or the like, for training the late lane change model.

For example, based on the information/data characterizing and contextualizing respective instances of late lane change, respective late lane change feature descriptions are generated for the respective instances of late lane changes. For example, a plurality of late lane change feature descriptions are generated. The late lane change model is then trained using at least a portion of the plurality of late lane change feature descriptions as training data. For example, a machine learning training algorithm is applied to train the late lane change model based on late lane change feature descriptions. In various embodiments, the late lane change feature description for an instance of late lane change comprises information identifying the location and time of the late lane change, other information characterizing the instance of late lane change (e.g., time duration, length duration, speed of the vehicle before, after, and/or during the instance of late lane change, etc.) and information contextualizing the instance of late lane change (e.g., TME topology and/or geometry, number of lanes, weather conditions, traffic conditions, and/or the like).

In various embodiments, the late lane change model is a deep neural network (DNN). For example, the late lane change model is a convolutional neural network (CNN), recurrent neural network (RNN), generative adversarial network (GAN), and/or the like. In an example embodiment, the late lane change model is a support vector machine. In an example embodiment, the training algorithm is a supervised, semi-supervised, or unsupervised machine learning technique. In various embodiments, the late lane change model is configured to determine whether late lane changes are likely along a TME (e.g., approaching an intersection/node along the TME) when provided with input information characterizing and/or contextualizing information regarding the TME (e.g., time of day/week/month/year, weather conditions, traffic conditions, map data, and/or the like). In an example embodiment, the late lane change model is configured to determine how likely lane changes are along a TME when provided with input comprising information characterizing and/or contextualizing information regarding the TME (e.g., time of day/week/month/year, weather conditions, traffic conditions, map data, and/or the like). In an example embodiment, the late lane change model is configured to determine whether late lane changes are likely and/or how likely late lane changes are along the TME and an expected severity of late lane changes along the TME.

At step/operation 512, once the late lane change model is sufficiently trained, the network apparatus 10 executes the late lane change model and/or and inference algorithm determined based at least in part on and/or derived at least in part from the late lane change model to determine a late lane change prediction for a TME. For example, the network apparatus 10 comprises means, such as processor 12, memory 14, and/or the like for executing the late lane change model and/or and inference algorithm determined based at least in part on and/or derived at least in part from the late lane change model to determine a late lane change prediction for a TME. In some embodiments, a late lane change prediction for a TME may be deployed to the vehicle 5 itself and/or to a network apparatus 10. In an example embodiment, the late lane change model is provided to and executed by a mobile apparatus 30 and/or the network apparatus 10.

For example, a feature description for a prediction scenario may be provided as input to the late lane change model and/or the inference algorithm and the late lane change model and/or the inference algorithm may process the input feature description for the prediction scenario and provide a late lane change prediction corresponding to the prediction scenario. In various embodiments, the prediction scenario is defined by one or more of traffic conditions, weather conditions, a particular TME (e.g., based on map data corresponding to the TME), TMEs having particular characteristics (e.g., topology, geometry, direction of travel, functional classification, and/or the like), time of the day/week/month/year (e.g., is a sign hidden by foliage during the spring and summer but not during the fall and winter?, is it during rush hour?, is it a weekend or holiday traffic pattern?, and/or the like). In various embodiments, the prediction scenario is defined by the input conditions described above as unlabeled data from vehicle sensors and/or labeled data from manually determined late maneuvers.

In various embodiments, the late lane change model and/or inference algorithm provides as output a late lane change prediction. In various embodiments, the late lane change prediction In an example embodiment, the late lane change model is configured to indicate whether late lane changes are likely and/or how likely late lane changes are along the TME under the prediction scenario, an expected severity of late lane changes along the TME under the prediction scenario, where along the TME late lane changes are expected and/or likely, direction of lane change expected (e.g., merging into the left most lane, merging into the right most lane, merging out of the right most lane, merging out of the left most lane, etc.), and/or the like.

In various embodiments, a late lane change model is trained that is specific to a particular TME. In various embodiments, a late lane change model is trained to receive information regarding a TME and possibly historical lane change information/data for the TME as input. In an example embodiment, a late lane change model is trained for a first TME and then modified based on historical late lane change model for a second TME (e.g., a TME having a similar geometry and/or topology to the first TME (e.g., same number of lanes, same intersection layout at one end of the TME, same functional road class, and/or the like)) to generate late lane predictions for the second TME. For example a transfer learning method may be used to generate late lane change predictions for a second TME using a late lane change model trained based on identified instances of late lane change along at least a first TME (where the first TME and the second TME are different TMEs and/or different road segments). In general, the term "transfer learning" relates to a method of machine learning that uses models trained for first areas for which sufficient data is available in second areas where sufficient data is not yet available. This process continues until there is sufficient data for the second area to create an accurate model particular to the second area and/or using the second area data. Using the historical late lane change information/data to modify and/or tailor the late lane change model for the first TME to be able to make late lane change predictions for the second TME is an example of transfer learning.

At step/operation 514, the late lane change prediction is used to update a digital map and at least a portion of the digital map is provided (e.g., transmitted) for receipt by one or more mobile apparatuses 30. For example, the network apparatus 10 may update a data record of a geographic database to include information/data corresponding to the late lane change prediction for the prediction scenario. For example, the network apparatus 10 may comprise means, such as processor 12, memory 14, communications interface 16, and/or the like, for updating a digital map to include at least a portion of the late lane change prediction and provide (e.g., transmit) at least the portion of the digital map comprising the at least a portion of the late lane change prediction. For example, the geographic database may include or be updated to include a table or other data record that comprises late lane change prediction information for one or more respective TMEs. In an example embodiment, the table include late lane change prediction information for only one respective TME and is part of the TME data record for the respective TME. In an example embodiment, the table includes late lane change prediction information for one or more respective TMEs with each instance of late lane change prediction information linked to the TME data record of the respective TME (e.g., for a particular time/location the chance/risk of late lane changes and/or possible traffic delays).

In various embodiments, the late lane change prediction information comprises information defining a prediction scenario (e.g., weather conditions, traffic conditions, time of day/week/month/year) and describing and/or indicating whether late lane changes are likely to occur, how likely late lane changes are to occur, the expected severity of late lane changes, where along the TME late lane changes are expected to occur, the direction of late lane change expected, expected and/or possible delays that may be caused by late lane changes for the prediction scenario, and/or the like.

In various embodiments, the network apparatus 10 provides the updated digital map and/or geographic database (or portion thereof) such that one or more mobile apparatuses 30 receive the updated digital map and/or geographic data (or portion thereof). In various embodiments, the network apparatus 10 stores the updated digital map and/or geographic database (or portion thereof) to memory 14.

At step/operation 516, the network apparatus 10 uses or causes the use of at least a portion of the late lane change prediction information included in the digital map to perform one or more navigation-related functions. For example the network apparatus 10 comprises means, such as processor 12, memory 14, communications interface 16, and/or the like to perform or cause performance of one or more navigation-related functions that use at least a portion of the late lane change prediction information included in the digital map as input. Some non-limiting examples of navigation-related functions include providing a route (e.g., via a user interface), localization, route determination, lane level route determination, operating a vehicle along a lane level route, route travel time determination, lane maintenance, route guidance, lane level route guidance, provision of traffic information/data, provision of lane level traffic information/data, vehicle trajectory determination and/or guidance, vehicle speed and/or handling control, route and/or maneuver visualization, providing a human perceivable notification or alert to make the operator aware of likely late lane changes along a TME, adjust one or more settings for sensors 39 and/or one or more operational parameters of the vehicle based on the likelihood of late lane change along a TME or a route, and/or the like. For example, a route may be selected that minimizes and/or reduces the chance of a vehicle performing or witnessing a late lane change based on the time of day/week/month/year, weather conditions, traffic conditions, and/or the like. For example, if a vehicle is traversing a TME where late lane changes are expected (e.g., at the current time and/or under the current weather and/or traffic conditions) a notification may be provided to the vehicle (e.g., to the mobile apparatus 30 in the case of an autonomous vehicle 5) such that one or more operational parameters of the vehicle 5 are modified and/or adapted so as to reduce the severity of any possible lane changes. For example, the one or more operational parameters may include operation of one or more sensors (e.g., which sensors are given more weight in making determinations, sampling speed, sensor data processing algorithm, and/or the like), speed of the vehicle, following distance, and/or the like. For example, if a vehicle is traversing a TME where late lane changes are expected (e.g., at the current time and/or under the current weather and/or traffic conditions) a human perceivable notification may be provided to a human operator of the vehicle (e.g., via a user interface 38 of a mobile apparatus 30) to warn the human operator that late lane changes are likely to occur along a particular section of road, and/or the like.

In an example embodiment, the digital map may be used to generate a maintenance action items provided to a traffic management organization (e.g., by transmitting information regarding the maintenance action items to service apparatus 40 that is operated by and/or on behalf of a traffic management organization). For example, the maintenance action items may indicate that foliage should be pruned near signs along a TME approaching a particular intersection/node (e.g., when late lane changes are more likely to occur during portions of the year where foliage may obstruct the sign from the road), that new signs should be added along a particular TME, and/or the like. For example, the maintenance action items may be action items that are expected to reduce the occurrence of late lane changes and/or reduce the severity of late lane changes along corresponding TMEs. navigation-related function

C. Exemplary Operation of a Mobile Computing Entity

In various embodiments, a mobile apparatus 30 onboard a vehicle 5 generates a routing information/data request. In an example embodiment, a user of the mobile apparatus 30 provides input to the mobile apparatus 30 via a user interface 38 of the mobile apparatus 30 that triggers the generation of the routing information/data request. In an example embodiment, the mobile apparatus 30 may automatically generate the routing information/data request in response to one or more triggers. For example, if the mobile apparatus 30 determines that the mobile apparatus 30 is in motion, the mobile apparatus 30 may automatically generate the routing information/data request. In various embodiments, the routing information/data request includes navigation and/or route information/data such as a route (e.g., from an origin to a destination), traffic information/data, lane level information/data for one or more upcoming maneuvers, and/or the like. In an example embodiment, the routing information/data request includes an origin location, a destination location, a current location of the mobile apparatus 30, and/or the like.

FIG. 6 provides a flowchart illustrating operations performed, such as by the mobile apparatus 30 to generate and provide a routing information/data request and to use a response thereto to perform a navigation-related function, in accordance with an example embodiment. Starting at block 602, a mobile apparatus 30 generates and provides a routing information/data request. For example, in response to user input received via user interface 38 and/or in response to an automated trigger, the mobile apparatus 30 generates and provides a routing information/data request. In various embodiments, the routing information/data request includes navigation and/or route information/data such as a route (e.g., from an origin to a destination), traffic information/data, late lane change information/data for one or more upcoming maneuvers, and/or the like. In an example embodiment, the routing information/data request includes an origin location, a destination location, a current location of the mobile apparatus 30, and/or the like. In various embodiments, the mobile apparatus 30 provides the request such that the network apparatus 10 receives the request.

At block 604, the mobile apparatus 30 receives a response to the routing information/data request including late lane change prediction for at least one time of routing information/data. For example, the mobile apparatus 30 may comprise means, such as processor 32, memory 34, communication interface 36, and/or the like for receiving a response to the routing information/data request comprising routing information/data. For example, a network apparatus 10 may provide a response to the routing information/data request comprising routing information/data such that the mobile apparatus 30 receives the response comprising the routing information/data and/or at least a portion of a digital map including late lane change prediction information for at least one TME of the digital map and/or along a route encoded by and/or provided by the response to the routing information/data request. In various embodiments, the routing information/data may include a route, information/data indicating a route, traffic information/data (e.g., for providing one or more alerts, warnings, notifications, and/or the like, such as a sudden braking warning alerting a user of the mobile apparatus 30 that the mobile apparatus 30 is approaching a sudden braking lane section, areas where late lane changes are likely to occur, and/or the like), late lane change information/data for one or more upcoming maneuvers, and/or the like.

At block 606, the mobile apparatus 30 may use at least a portion of the routing information/data to perform one or more navigation-related functions. For example, the mobile apparatus 30 may use the routing information/data to perform one or more navigation-related functions. For example, the mobile apparatus 30 may comprise means, such as processor 32, memory 34, communication interface 36, user interface 38, and/or the like, for using the routing information/data to perform one or more navigation-related functions. Some non-limiting examples of navigation-related functions include localization, route determination, lane level route determination, operating a vehicle along a lane level route, route travel time determination, lane maintenance, route guidance, lane level route guidance, provision of traffic information/data, provision of accident rate in respective condition, provision of lane level traffic information/data, vehicle trajectory determination and/or guidance, vehicle speed and/or handling control, route and/or maneuver visualization, provision of safety alerts, and/or the like.

For example, a route may be selected that minimizes and/or reduces the chance of a vehicle performing or witnessing a late lane change based on the time of day/week/month/year, weather conditions, traffic conditions, and/or the like. For example, if a vehicle is traversing a TME where late lane changes are expected (e.g., at the current time and/or under the current weather and/or traffic conditions) a notification may be provided to the processor 32 such that one or more operational parameters of the vehicle 5 are modified and/or adapted so as to reduce the severity of any possible lane changes. For example, the one or more operational parameters may include operation of one or more sensors (e.g., which sensors are given more weight in making determinations, sampling speed, sensor data processing algorithm, and/or the like), speed of the vehicle, following distance, and/or the like. For example, if a vehicle is traversing a TME where late lane changes are expected (e.g., at the current time and/or under the current weather and/or traffic conditions) a human perceivable notification may be provided to a human operator of the vehicle (e.g., via a user interface 38 of a mobile apparatus 30) to warn the human operator that late lane changes are likely to occur along a particular section of road, and/or the like.

D. Technical Advantages

In various scenarios, the occurrence of a late lane change can have negative effects on other traffic on the TME where the late lane change occurred. For example, the late lane change may cause other vehicles along the TME to slow down so that the late lane change can be performed, cause collisions to occur, and/or the like. However, conventional navigation applications do not provide means for predicting, reducing, and/or mitigating the effects of instances of late lane change. Therefore, there exists technical problems, in the navigation-related arts regarding how to predict, reduce, and/or mitigate the effects of late lane changes.

Various embodiments provide technical solutions to these technical problems. For example, various embodiments generate late lane change feature descriptions corresponding to identified instances of late lane changes and use the late lane change feature descriptions to train a late lane change model. The late lane change model is configured to generate late lane change predictions. These late lane change predictions are then used to reduce the occurrence of late lane changes and/or mitigate the effects of late lane changes. For example, the late lane change predictions are stored to a digital map in association with the corresponding TME, used as input to one or more navigation-related functions, used to provide to notifications and/or alerts to vehicles and/or vehicle operators/passengers traversing or in the vicinity of the corresponding TME, and/or the like. For example, navigational guidance may be provided to vehicle operators to perform lane changes earlier, notifications and/or alerts may be provided to vehicle operators to be aware of other vehicles that may perform late lane changes, notify right of way maintenance crews to check the visibility of particular signs, and/or the like. Thus, various embodiments provide technical advantages that enable the prediction of when, where, and/or under what conditions late lane changes may occur such that instances of late lane changes may be reduced and/or the effects of late lane changes may be reduced.

IV. Example Apparatus

The network apparatus 10, probe apparatus 20, mobile apparatus 30, and/or service apparatus 40 of an example embodiment may be embodied by or associated with a variety of computing devices including, for example, a navigation system including an in-vehicle navigation system, a vehicle control system, a personal navigation device (PND) or a portable navigation device, an advanced driver assistance system (ADAS), a global navigation satellite system (GNSS), a cellular telephone, a mobile phone, a personal digital assistant (PDA), a watch, a camera, a computer, and/or other device that can perform navigation-related functions, such as digital routing and map display. Additionally or alternatively, the network apparatus 10, probe apparatus 20, mobile apparatus 30, and/or service apparatus 40 may be embodied in other types of computing devices, such as a server, a personal computer, a computer workstation, a laptop computer, a plurality of networked computing devices or the like, that are configured to update one or more map tiles, analyze instances of probe data for route planning or other purposes. In an example embodiment, a probe apparatus 20 is an in-vehicle navigation system onboard a vehicle 5 or a mobile device; a network apparatus 10 is a server; a mobile apparatus 30 is a navigation system and/or device, and a service apparatus 40 is a server or Cloud-based computing resource, and/or the like.

In this regard, FIG. 2A depicts an example network apparatus 10, FIG. 2B depicts an example probe apparatus 20, and FIG. 2C depicts an example mobile apparatus 30 that may be embodied by various computing devices including those identified above. As shown, the network apparatus 10 of an example embodiment may include, may be associated with, or may otherwise be in communication with a processor 12 and a memory device 14 and optionally a communication interface 16 and/or a user interface 18. Similarly, a probe apparatus 20 of an example embodiment may include, may be associated with, or may otherwise be in communication with a processor 22 and a memory device 24 and optionally a communication interface 26, a user interface 28, one or more sensors 29 (e.g., a location sensor such as a GNSS sensor, IMU sensors, and/or the like; camera(s); 2D and/or 3D LiDAR(s); long, medium, and/or short range RADAR; ultrasonic sensors; electromagnetic sensors; (near-)IR cameras, 3D cameras, 360° cameras; and/or other sensors that enable the probe apparatus to determine one or more features of the corresponding vehicle's 5 surroundings), and/or other components configured to perform various operations, procedures, functions, or the like described herein. Similarly, a mobile apparatus 30 of an example embodiment may include, may be associated with, or may otherwise be in communication with a processor 32 and a memory device 34 and optionally a communication interface 36, a user interface 38, one or more sensors 39 (e.g., a location sensor such as a GNSS sensor, IMU sensors, and/or the like; camera(s); 2D and/or 3D LiDAR(s); long, medium, and/or short range RADAR; ultrasonic sensors; electromagnetic sensors; (near-)IR cameras, 3D cameras, 360° cameras; and/or other sensors that enable the probe apparatus to determine one or more features of the corresponding vehicle's 5 surroundings), and/or other components configured to perform various operations, procedures, functions, or the like described herein. In various embodiments, a service apparatus 40 comprises one or more components similar to those of the network apparatus 10 (e.g., one or more processors, one or more memory devices, one or more communication interfaces, and/or one or more user interfaces).

In some embodiments, the processor 12, 22, 32 (and/or co-processors or any other processing circuitry assisting or otherwise associated with the processor) may be in communication with the memory device 14, 24, 34 via a bus for passing information among components of the apparatus. The memory device may be non-transitory and may include, for example, one or more volatile and/or non-volatile memories. In other words, for example, the memory device may be an electronic storage device (e.g., a non-transitory computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the network apparatus 10, probe apparatus 20, mobile apparatus 30, and/or service apparatus 40 may be embodied by a computing device. However, in some embodiments, a respective apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12, 22, 32 may be embodied in a number of different ways. For example, the processor 12, 22, 32 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 12, 22, 32 may include one or more processing cores configured to perform independently. A multi-core processor may enable multiprocessing within a single physical package. Additionally or alternatively, the processor 12, 22, 32 may include one or more processors configured in tandem via the bus to enable independent execution of instructions, pipelining and/or multithreading.

In an example embodiment, the processor 12, 22, 32 may be configured to execute instructions stored in the memory device 14, 24, 34 or otherwise accessible to the processor. For example, the processor 22 may be configured to execute computer-executable instructions embedded within a link record of a map tile and/or provided as part of a conflict-resolved travel plan. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the network apparatus 10, probe apparatus 30, mobile apparatus 30, and/or service apparatus 40 may include a user interface 18, 28, 38 that may, in turn, be in communication with the processor 12, 22, 32 to provide output to the user, such as one or more potential DFC corridors and the corresponding rankings, and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor 12, 22, 32 (e.g., memory device 14, 24, 34, and/or the like).

The network apparatus 10, probe apparatus 20, mobile apparatus 30, and/or service apparatus 40 may optionally include a communication interface 16, 26, 36. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In addition to embodying the network apparatus 10, probe apparatus 20, mobile apparatus 30, service apparatus 40 of an example embodiment, a navigation system may also include or have access to a geographic database that includes a variety of data (e.g., map information/data, at least a portion of a late lane change digital map representing at least a portion of the traversable network) utilized in constructing a route or navigation path, determining the time to traverse the route or navigation path, matching a geolocation (e.g., a GNSS determined location) to a point on a map, a late lane change network, and/or link, and/or the like. For example, a geographic database may include a late lane change information/data derived and/or determined based on one or more late lane change predictions, lane data records, road segment or link data records, point of interest (POI) data records and other data records. More, fewer or different data records can be provided. In one embodiment, the other data records include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GNSS data associations (such as using known or future map matching or geo-coding techniques), for example. In an example embodiment, the data records may comprise nodes, connection information/data, intersection data records, link data records, lane data records, POI data records, and/or other data records.

In an example embodiment, the network apparatus 10 may be configured to modify, update, and/or the like one or more data records of the geographic database. For example, the network apparatus 10 may modify, update, and/or the like the digital map to include late lane change information/data derived and/or determined based on one or more late lane change predictions and/or the corresponding data records, a localization layer and/or the corresponding data records, and/or the like.

In an example embodiment, the connection information/data and/or road segment data records are links or segments, e.g., maneuvers of a maneuver graph, representing roads, streets, or paths, as can be used in the calculated route or recorded route information for determination of one or more personalized routes. The intersection data records are end points corresponding to the respective links or segments of the road segment data records. The road link data records and the intersection data records represent a traversable network, such as used by vehicles, cars, pedestrians, bicyclists, and/or other entities. Similarly, the nodes and connection information/data of the late lane change digital map represent a lane network, such as used by vehicles, cars, and/or other entities. Alternatively, the geographic database can contain path segment and intersection data records or nodes and connection information/data or other data that represent pedestrian paths or areas in addition to or instead of the vehicle road record data, for example.

The road/link segments, intersections, and/or nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database can include data about the POIs and their respective locations in the POI data records. The geographic database can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the geographic database can include and/or be associated with event data (e.g., traffic incidents, constructions, scheduled events, unscheduled events, etc.) associated with the POI data records or other records of the geographic database.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used. In an example embodiment, the geographic database (e.g., the late lane change digital map) may be generated and/or updated based on information/data provided by a plurality of non-dedicated probe apparatuses. For example, the probe apparatuses may be onboard vehicles owned and/or operated by and/or on behalf of members of the general public such that, for example, new drives used to generate and/or update the late lane change digital map may be crowdsourced.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions. The navigation-related functions can correspond to vehicle navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases. Regardless of the manner in which the databases are compiled and maintained, a navigation system that embodies a network apparatus 10, probe apparatus 20, mobile apparatus 30, and/or service apparatus 40 in accordance with an example embodiment may determine the time to traverse a route that includes one or more turns at respective intersections more accurately.

V. Apparatus, Methods, and Computer Program Products

As described above, FIGS. 3, 4, 5, and 6 illustrate flowcharts of a present embodiment of FIG. 1, network apparatus 10, probe apparatus 20, mobile apparatus 30, and/or service apparatus 40, methods, and computer program products according to an example embodiment of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 14, 24, 34 of an apparatus employing an embodiment of the present invention and executed by the processor 12, 22, 32 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
obtaining, by one or more processors, a plurality of instances of probe data corresponding to a vehicle making a lane change while traversing at least a portion of a traversable network;
responsive to determining that the lane change is a late lane change, extracting, by the one or more processors, location information from at least one of the plurality of instances of probe data, the location information indicating a location where the late lane change occurred;
obtaining, by the one or more processors, at least one of map data, weather data, or traffic data corresponding to the location where the late lane change occurred;
generating, by the one or more processors, a late lane change feature description based on information regarding the late lane change extracted from the plurality of instances of probe data and the at least one of map data, weather data, or traffic data;
training, by the one or more processors, a late lane change model using a machine learning technique and training data, the training data comprising the late lane change feature description;
executing, by the one or more processors, the late lane change model to generate a late lane change prediction corresponding to a traversable map element of a digital map that provides a representation of the traversable network; and
causing, by the one or more processors, at least one of (a) the digital map to be updated based at least in part on the late lane change prediction, (b) traffic data corresponding to the traversable map element to be updated based at least in part on the late lane change prediction, or (c) a navigation-related function to be performed using at least a portion of the late lane change prediction as input.

2. The method of claim 1, wherein determining that the lane change is a late change comprises processing at least one of the plurality of instances of probe data to determine at least one of (a) how long before the end of a maneuver a driver changed lanes, (b) how many times the maneuver has been repeated if announced, or (c) the type of lane marking on road surface where the maneuver was performed.

3. The method of claim 2, further comprising determining late lane change elements configured to characterize the lane change, the late lane change elements comprising at least one of a time of the maneuver, start of the maneuver, time duration of the maneuver, length duration of the maneuver, end of the maneuver, number of vehicles impacted by the maneuver, speed of the vehicle, weather conditions, curvature of a traversable map element corresponding to a road segment on which the late lane change occurred, number of lanes of the road segment on which the late lane change occurred, or visibility information for the location where the late lane change occurred.

4. The method of claim 1, wherein determining that the lane change is a late change comprises determining that the lane change that satisfies at least one of (a) a time until beginning of next maneuver threshold, (b) a distance until beginning of next maneuver threshold, (c) a lane change time duration threshold, (d) a lane change distance duration threshold, (e) a time between announcing lane change and beginning the lane change threshold, or (f) a statistical threshold.

5. The method of claim 1, further comprising classifying a severity of the late lane change based at least in part on at least a portion of the plurality of instances of probe data corresponding to the vehicle making the lane change.

6. The method of claim 5, wherein the late lane change prediction comprises an expected severity of lane change.

7. The method of claim 1, wherein the traffic data corresponding to the location where the lane change occurred is determined based at least in part on at least one of a vehicle camera data, Lidar data, radar data, or traffic monitoring data corresponding to the location where the lane change occurred and a time when the lane change occurred.

8. The method of claim 7, wherein the late lane change model is configured to receive as input at least one of signage obstruction information, visibility information, vehicle navigation system information, driver attentiveness information, or point of interest proximity information.

9. The method of claim 1, further comprising using transfer learning to train the late lane change model to generate late lane change predictions for a second traversable map element, wherein the training data does not comprise data corresponding to the second traversable map element for which a predetermined amount of training data is not available.

10. The method of claim 1, wherein using at least a portion of the late lane change prediction as input for performing the positioning and/or navigation-related function causes a notification to be provided.

11. The method of claim 10, wherein the notification is generated based at least in part on an expected severity of lane change indicated by the late lane change prediction.

12. An apparatus comprising at least one processor and at least one memory storing computer program code, the at least one memory and the computer program code configured to, with the processor, cause the apparatus to at least:
generate respective late lane change feature descriptions for a plurality of late lane changes, a respective late lane change feature description comprising information regarding a respective late lane change and at least one of map data, weather data, or traffic data corresponding to a respective location of the respective late lane change; and
train a late lane change model using a machine learning technique based at least in part training data comprising the respective late lane change feature descriptions;
wherein, the late lane change model is trained such that the late lane change model is configured to receive an input feature description characterizing a prediction scenario corresponding to a traversable map element and provide a late lane change prediction corresponding to the prediction scenario, the late lane change prediction configured to be used for at least one of (a) updating a digital map, (b) updating traffic data corresponding to the traversable map element, or (c) used as input for performing a navigation-related function.

13. The apparatus of claim 12, wherein the plurality of late lane changes each occurred along a first traversable map element and the late lane change model is configured to generate late lane change predictions corresponding to the first traversable map element.

14. The apparatus of claim 13, wherein the at least one memory and the computer program code are further configured to, with the processor, cause the apparatus to access historical late lane change information corresponding to late lane changes that occurred along a second traversable map element and use transfer learning and the historical late lane change information to cause the late lane change model to generate late lane change predictions for the second traversable map element.

15. The apparatus of claim 12, wherein the late lane change prediction comprises at least one of an indication of whether late lane changes are likely to occur under the prediction scenario, a likelihood that late lane changes will occur under the prediction scenario, an expected severity of late lane changes occurring under the prediction scenario, where along the traversable map element corresponding to the prediction scenario late lane changes are expected to occur, the expected direction of late lane changes, or expected delays caused by late lane changes under the prediction scenario.

16. The apparatus of claim 12, wherein the respective late lane change feature description is an instance of labeled input data comprising input data that contextualizes the respective late lane change and label data that characterizes the respective late lane change, and an input layer of the late lane change model is configured to receive the input data.

17. The apparatus of claim 16, wherein an output layer of the late lane change model is configured to provide output characterizing a predicted lane change.

18. A computer program product comprising at least one non-transitory computer-readable storage medium having computer-readable program code portions stored therein, the computer-readable program code portions comprising executable portions configured, when executed by a processor of an apparatus, to cause the apparatus to:
access a late lane change model that was trained using a machine learning technique based at least in part on training data comprising a plurality of late lane change feature descriptions, a respective late lane change feature description comprising information characterizing a respective late lane change and at least one of map data, weather data, or traffic data corresponding to a respective location of the respective late lane change;
execute the late lane change model to generate a late lane change prediction corresponding to a traversable map element of a digital map that provides a representation of the traversable network; and
cause at least one of (a) the digital map to be updated based at least in part on the late lane change prediction, (b) traffic data corresponding to the traversable map element to be updated based at least in part on the late lane change prediction, or (c) a navigation-related function to be performed using at least a portion of the late lane change prediction as input.

19. The computer program product of claim 18, wherein using at least a portion of the late lane change prediction as input for performing the positioning and/or navigation-related function causes a notification to be provided.

20. The computer program product of claim 19, wherein the notification is generated based at least in part on an expected severity of lane change indicated by the late lane change prediction.

* * * * *